(12) United States Patent
Lortscher et al.

(10) Patent No.: US 11,744,194 B2
(45) Date of Patent: Sep. 5, 2023

(54) PLANT IRRIGATION DEVICE

(71) Applicant: Stingray Watering System, LLC, Calabasas, CA (US)

(72) Inventors: Lance James Lortscher, Hidden Hills, CA (US); Mark Alan Christl, Simi Valley, CA (US)

(73) Assignee: Stingray Watering System, LLC, Calabasas, CA (US)

( * ) Notice: Subject to any disclaimer, the term of this patent is extended or adjusted under 35 U.S.C. 154(b) by 174 days.

(21) Appl. No.: 17/355,778

(22) Filed: Jun. 23, 2021

(65) Prior Publication Data

US 2021/0315173 A1  Oct. 14, 2021

Related U.S. Application Data

(63) Continuation of application No. 16/434,587, filed on Jun. 7, 2019, now Pat. No. 11,058,073, which is a continuation-in-part of application No. 15/190,770, filed on Jun. 23, 2016, now Pat. No. 10,328,663.

(60) Provisional application No. 62/186,000, filed on Jun. 29, 2015.

(51) Int. Cl.
| | |
|---|---|
| *A01G 25/02* | (2006.01) |
| *A01M 17/00* | (2006.01) |
| *A01G 13/02* | (2006.01) |
| *A01G 13/00* | (2006.01) |

(52) U.S. Cl.
CPC ....... *A01G 25/023* (2013.01); *A01G 13/0268* (2013.01); *A01M 17/00* (2013.01); *A01G 2013/006* (2013.01)

(58) Field of Classification Search
CPC .. A01G 25/023; A01G 13/0281; A01G 27/02; A01G 13/0293; A01G 13/0268
See application file for complete search history.

(56) References Cited

U.S. PATENT DOCUMENTS

| | | |
|---|---|---|
| 3,302,323 A | 2/1967 | Popa |
| 4,065,926 A | 1/1978 | Brandt |
| 4,336,666 A | 6/1982 | Caso |
| 4,603,077 A | 7/1986 | Fujimoto et al. |
| 4,870,781 A | 10/1989 | Jones |
| 5,224,967 A | 7/1993 | Rolf et al. |
| 5,231,793 A | 8/1993 | Allen |
| 5,839,659 A | 11/1998 | Murray |
| 5,881,495 A | 3/1999 | Clark |
| 6,127,027 A | 10/2000 | Nogami et al. |
| 6,161,776 A | 12/2000 | Byles |
| 6,178,690 B1 | 1/2001 | Yoshida et al. |
| 6,195,935 B1 | 3/2001 | Bellucci et al. |
| 6,253,486 B1 | 7/2001 | Prassas et al. |
| 6,996,932 B2 | 2/2006 | Kruer et al. |
| 6,997,402 B2 | 2/2006 | Kruer et al. |
| 7,392,614 B2 | 7/2008 | Kruer et al. |
| 7,647,724 B2 * | 1/2010 | Caron ............. A01G 25/06 47/1.01 R |

(Continued)

*Primary Examiner* — Monica L Perry
(74) *Attorney, Agent, or Firm* — Kelly & Kelley, LLP

(57) ABSTRACT

A plant irrigation device includes a support that surrounds a plant and provides an opening through which the plant extends. A drip tube is attached to the support and connectable to a water source. The drip tube has a series of spaced apart apertures or water emitters along a length thereof permitting water to exit the drip tube and into the ground surrounding the plant.

16 Claims, 29 Drawing Sheets

(56) References Cited

U.S. PATENT DOCUMENTS

| | | |
|---|---|---|
| 7,798,746 B2 | 9/2010 | Byles |
| 8,132,739 B2 | 3/2012 | Theoret et al. |
| 8,342,213 B2 | 1/2013 | Sutton et al. |
| 8,567,117 B2 | 10/2013 | Spittle |
| 8,584,400 B2 | 11/2013 | Muthiah et al. |
| 8,919,038 B2 | 12/2014 | Jensen |
| 9,254,431 B1 | 2/2016 | Sites |
| 2002/0132099 A1 | 9/2002 | Squires |
| 2005/0145716 A1 | 7/2005 | Manning |
| 2005/0178056 A1 | 8/2005 | Morrone |
| 2007/0144065 A1* | 6/2007 | Lowe .............. A01G 25/06 47/21.1 |
| 2008/0163566 A1 | 7/2008 | Bella |
| 2008/0271366 A1 | 11/2008 | Thompson et al. |
| 2010/0055461 A1 | 3/2010 | Daluise et al. |
| 2010/0084491 A1 | 4/2010 | Williams et al. |
| 2010/0219265 A1 | 9/2010 | Feld |
| 2013/0126643 A1 | 5/2013 | McLarty |
| 2016/0128287 A1 | 5/2016 | Lockhart et al. |

\* cited by examiner

PLANT IRRIGATION DEVICE

RELATED APPLICATION

This application is a continuation of U.S. application Ser. No. 16/434,587, filed Jun. 7, 2019, which is a continuation-in-part of U.S. application Ser. No. 15/190,770, filed on Jun. 23, 2016 (now U.S. Pat. No. 10,328,663), which claims the benefit of U.S. Provisional Application No. 62/186,000, filed Jun. 29, 2015.

BACKGROUND OF THE INVENTION

The present invention generally relates to devices and systems for distributing water for the irrigation of cultivated plants. More specifically, the present invention is directed to an efficient irrigation device that limits evaporation, directs water to the roots of the plants, and controls weeds.

There are many different systems in use today for distributing water for the irrigation of cultivated plants, some of the systems being more effective and efficient than others. As water conservation increasingly becomes more important due to drought conditions and resulting city water use restrictions, there is a need for new devices and methods meant to very efficiently irrigate plants by not wasting water, but at the same time effectively providing the plants with enough water to keep them healthy.

A common method of watering plants is by hand. Conventional garden hoses or watering buckets are used for watering trees, shrubs, flowers, garden plants, etc. While this method delivers water directly to the plants, preventing water from being wasted where it is not needed, it is very time consuming and also wasteful in other ways. Irrigating plants in this way delivers water at a rate that is often too high to allow the soil and plant roots time to effectively absorb the water. Consequently, the resulting standing water is prone to evaporation or runoff.

Another common method of watering plants is by using sprinklers to simulate rainfall. While this method is effective for watering a large area of plants with little effort, it is also wasteful. Because the water is sprayed across the air in small droplets, it is more susceptible to evaporation, especially in dry climates. Also, the water droplets are not directed toward the roots of the plants where the water is most needed and much of the water is blocked from the roots by the plants' foliage or lands in areas where it is not needed. Even in a slightest breeze, much of the water from sprinkler systems is blown off target and wasted. This is known as wind drift.

To help solve these problems drip irrigation systems have been developed and have been considered to be the most desirable form of irrigation. Drip irrigation systems are desirable because they have been shown to save water, reduce labor, and are not as prone to evaporation or other environmental effects as are other irrigation systems. Drip irrigation systems are categorized as either line source or point source dissipation systems.

Line source dissipation systems, often referred to as soaker hose or drip tape, dispense water uniformly across the entire length of the water lines. This system is often used to water plants that are planted in line and close together. The soaker hose efficiently waters the plants by dispensing water in small amounts to the roots of the plants. This allows for the soil and roots to soak up the water minimizing evaporation and runoff. However, this system presents a problem when plants are spaced further apart because water is dispensed in unwanted areas.

Point source dissipation systems are designed to dispense water for plants that are spaced further apart and in scattered patterns. Water impermeable tubes extend from a main tube to the base of a plant where they have a dripper attached. This dripper drips water at the base of a plant when the system is turned on. This effectively waters plants that are spaced further apart without wasting water; however, other problems are presented with this system. Oftentimes water is not evenly distributed to the roots resulting in the root system of the plants not developing uniformly. Also, a standard drip emitter still releases more water than the plants need and consequently the water is wasted through runoff or evaporation. Pulsed and "Ultra Low Drip Irrigation" systems have been developed to solve this problem, but they require a great deal of maintenance as the drippers are easily clogged. These are also prone to damage and vandalism.

In addition to watering systems, the present invention relates to weed control. There are various forms of mulch used in the home landscaping industry with additional types produced for commercial agriculture applications. The benefits of mulching include less water evaporation, less weeds, soil warming, and heat retention leading to earlier and higher yields, erosion control, and a more uniform appearance. Types of mulch include organic, plastic film, and irrigated mats.

Organic mulch, such as hardwood bark and pine needles, tend to be the most aesthetically pleasing, but organic mulch does have drawbacks. For example, it tends to quickly degrade in the environment, to wash away with heavy rains, or even to blow away with heavy winds.

Plastic mulch includes agricultural film, rings, and geotextiles. These are effective weed barriers and are preferred in most commercial applications where they can be placed prior to planting. They are very effective at preventing soil erosion and provide weed control while minimizing surface water evaporation. The perforated or woven versions, which are air and water permeable, are proving to be less desirable as weeds take root through the pores and cannot be removed.

To solve the problems presented by the drip systems and to combine the benefits of mulch with drip irrigation, mat watering systems have been developed. These systems provide for very little water waste as the water delivered to the plant is controlled by the mat, preventing over-watering. Also, since the mat is covering the dispensed water and the ground, water evaporation is not a problem. Since the mat is a form of mulch, it also acts as a weed controlling device as it prevents weeds from growing on the ground it covers.

One such mat watering system is disclosed in U.S. Pat. No. 6,997,402 to Kruer et al., which teaches a unitized mat of at least two polymeric material layers which are sized and shaped to cover an area immediately around at least one plant. The layers have an aperture for the plant to grow through and also an overlapping seam allowing the mat to completely cover the soil around the base of the plant. Fluid-conveying passageways are molded into at least one of these polymeric layers, which are meant to dispense and meter fluid into a root zone of the plant.

This mat system, however, has a number of disadvantages. The polymeric material layers that make up the mat are impervious to liquids and gases, which is not conducive to the overall health of the plant. For a plant to thrive, it needs the soil around its roots to contain a range of oxygen, nitrogen, and other gases that support the microbe environment of the soil. When an air impermeable mat is placed over the soil that blocks the passage of air to and from the soil, there is a risk that the microbe environment of the soil around the root system of the plant will not be supported and consequently, the plant will not thrive. This mat system also has the water-conveying passages molded into the layers, requiring a more complicated manufacturing process. For example, there have to be a number of different molds designed depending on the type of plant that will be watered by the mat. There also have to be different molds for the top layer and bottom layer of each type of mat. Additionally, when bonding the top layer to the bottom layer, extra care must also be taken to ensure that all of the areas are bound except for the water passageways.

Accordingly, there is a need for a device that provides the benefits of a typical mat watering system, but also is permeable to air to be conducive to soil and air gas exchange. There is also a need for a mat watering device that is inexpensive and simple to manufacture. The present invention fulfills these needs and provides other related advantages.

SUMMARY OF THE INVENTION

The present invention is directed to an irrigation device for facilitating growth of a plant. The invention generally comprises an air and water permeable mat which is disposable on a ground surface having an opening through which a plant extends. A slit may be formed in the mat to facilitate placement of the mat around an existing plant. A drip tube is disposed within or attached to the mat. The drip tube has an open end connectable to a water source and a series of spaced apart apertures or water emitters along a length thereof, permitting water to exit the drip tube, through the mat and into the ground surrounding the plant.

The mat may be comprised of a first sheet of material defining an upper mat surface and a second sheet of material defining a lower surface of the mat. The first and second sheets are attached to one another so as to retain the drip tube therebetween. The first and second sheets of material may be comprised of a heat fusible material that are heat fused-attached to one another.

The mat may be comprised of a water and air permeable molded or fused material in which the drip tube is suspended. The mat material may comprise woven material, organic material, molded gel or foam.

One or more secondary openings may be formed in the mat, such as the first and second sheets of material, of a size for additional plants to extend through the mat. A pattern may also be formed on the mat, such as on the first and/or second sheet of mat material, to facilitate air or water flow through the mat. The material comprising the mat, such as at least one of the first and/or second sheets of material, may inhibit roots or plants from growing therethrough.

The first and second sheets of material comprising the mat may comprise a polymer having apertures therethrough to permit air and water to pass through the mat. A plurality of hollow, downwardly directed spikes may be formed in the second sheet of material. The tips of the spikes may be selectively removable to permit water to flow through the spikes and into the ground.

A water conveying material may be disposed between the first and second sheets of material comprising the mat.

The irrigation device may also comprise a support having a configuration to surround a plant and provide an opening through which the plant extends. The support may be comprised of a rigid material. The support may have a generally C-shaped configuration. The support may have a generally circular configuration with free ends creating a slot for insertion of a plant therethrough and into the opening in a central portion thereof. The support may be generally planar. The support may comprise a generally planar web or lattice structure.

A drip tube is attached to the support. The drip tube is connectable to a water source and has a series of spaced apart apertures or water emitters along a length thereof to permit water to exit the drip tube and into the ground surrounding the plant. The drip tube may be comprised of a flexible material. The drip tube may have a generally circular or semi-circular configuration when attached to the support. The support may define an open-faced channel into which the drip tube is disposed. The drip tube may be formed integrally with the support, including formed integrally with the web or lattice structure forming the support.

The water emitters may have at least one of pressure compensating, anti-syphon, self-flushing, anti-clogging or check valve properties. The water emitters may comprise spray nozzles.

At least one sheet of material may extend over the support. The at least one sheet of material may inhibit roots or plants from growing therethrough. The at least one sheet of material may be water permeable. The at least one sheet of material may comprise upper and lower sheets of material comprised of water permeable material disposed on upper and lower faces of the support.

A hollow stake may be associated with the mat. The hollow stake may receive fertilizer, insecticide or fungicide therein. The hollow stake is configured to permit the fertilizer, insecticide or fungicide to pass therethrough and into the ground. The hollow stake may include a cap removably covering an open end of the stake. Other stakes may be used that extend through the mat or associated with the support for directing water into the ground towards roots of an associated plant.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
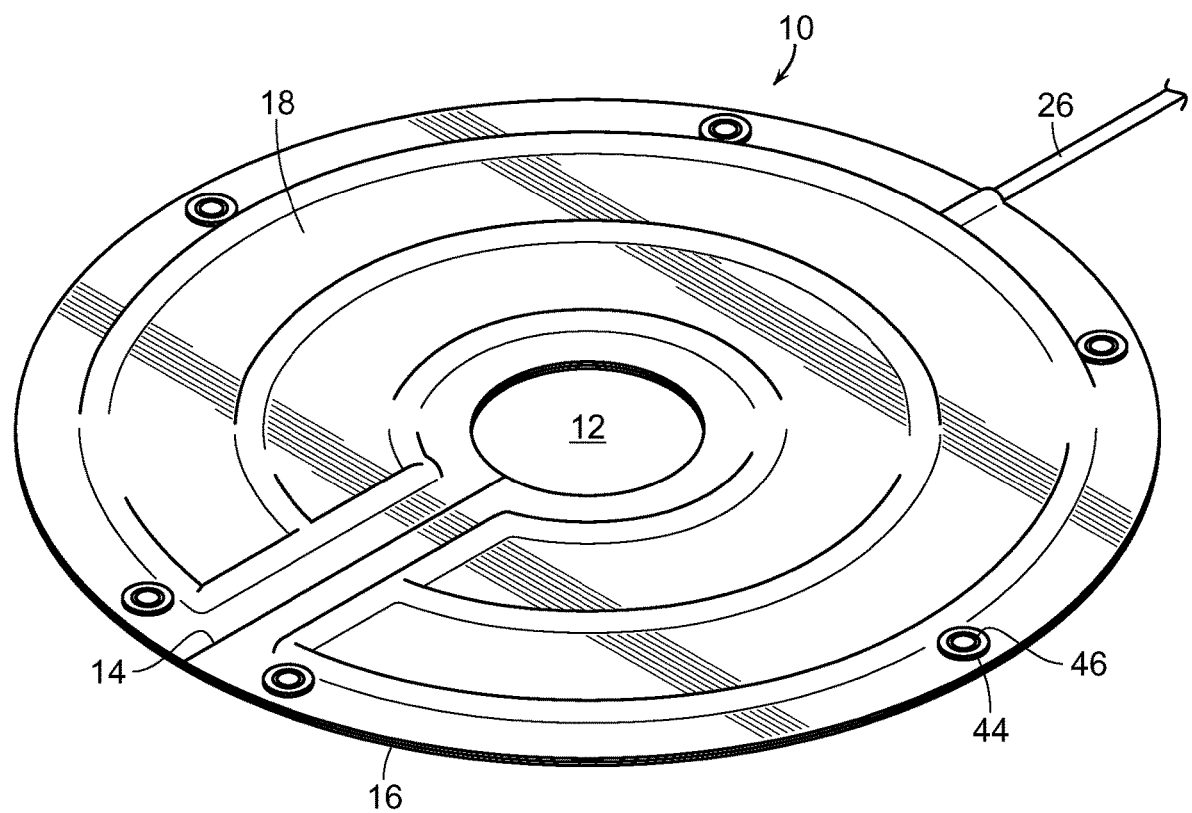
FIG. 1 is a top view of an irrigation mat device for watering plants, embodying the present invention.

As shown in the drawings, for exemplary purposes, the present invention is directed to an irrigation device in the form of a watering mat that efficiently irrigates and waters plants associated with the mat. Typically, the mat is designed so as to inhibit weeds or root growth therethrough as well. The irrigation mat device of the present invention provides an efficient way to irrigate plants by optimizing water release rates, preventing water evaporation, preventing water runoff, and helping to control weeds while being simple in design so as to be easy to manufacture and install.

Figure 2:
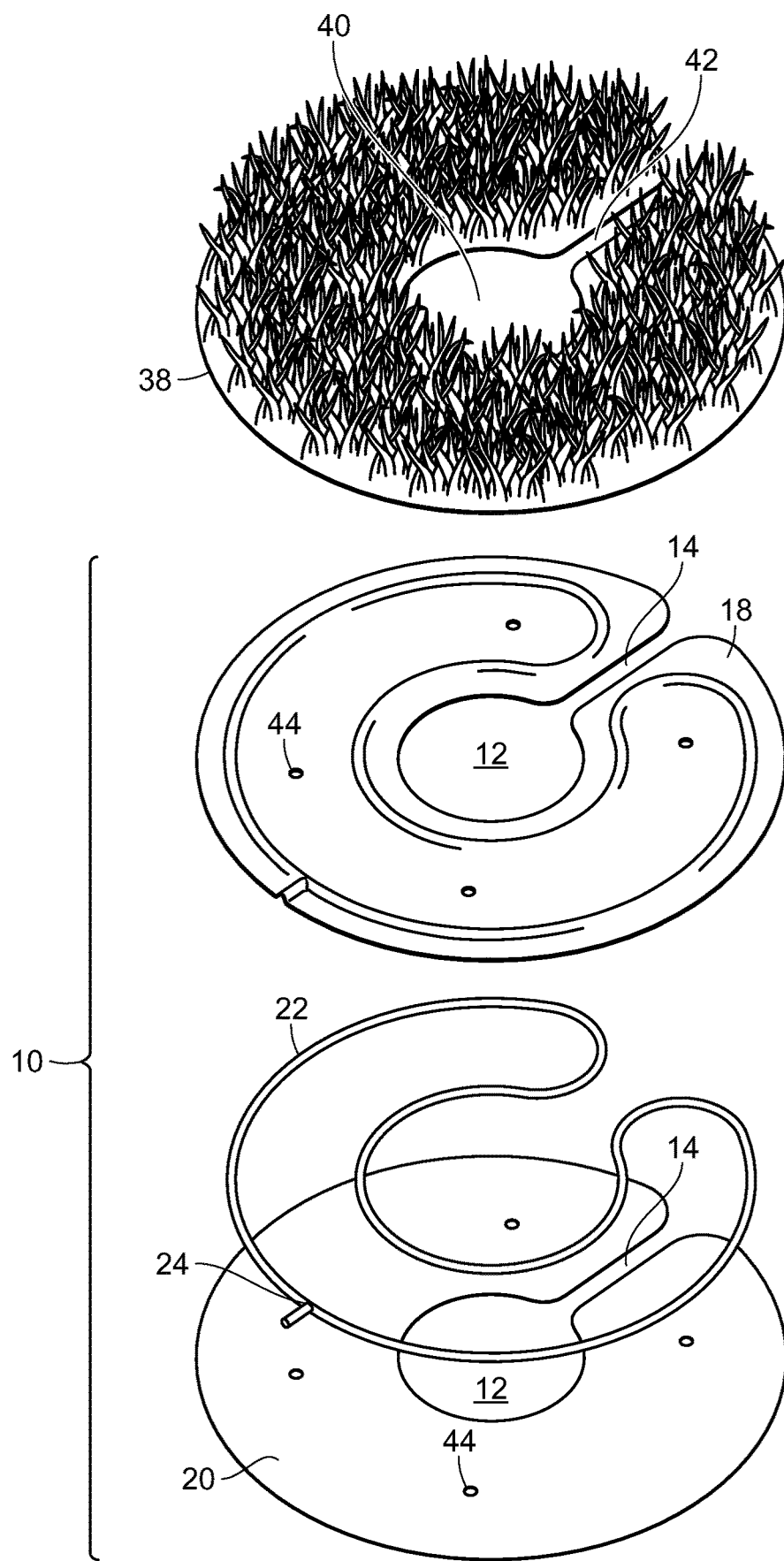
FIG. 2 is an exploded perspective view of the mat, and an artificial turf overlay.
Figure 3:
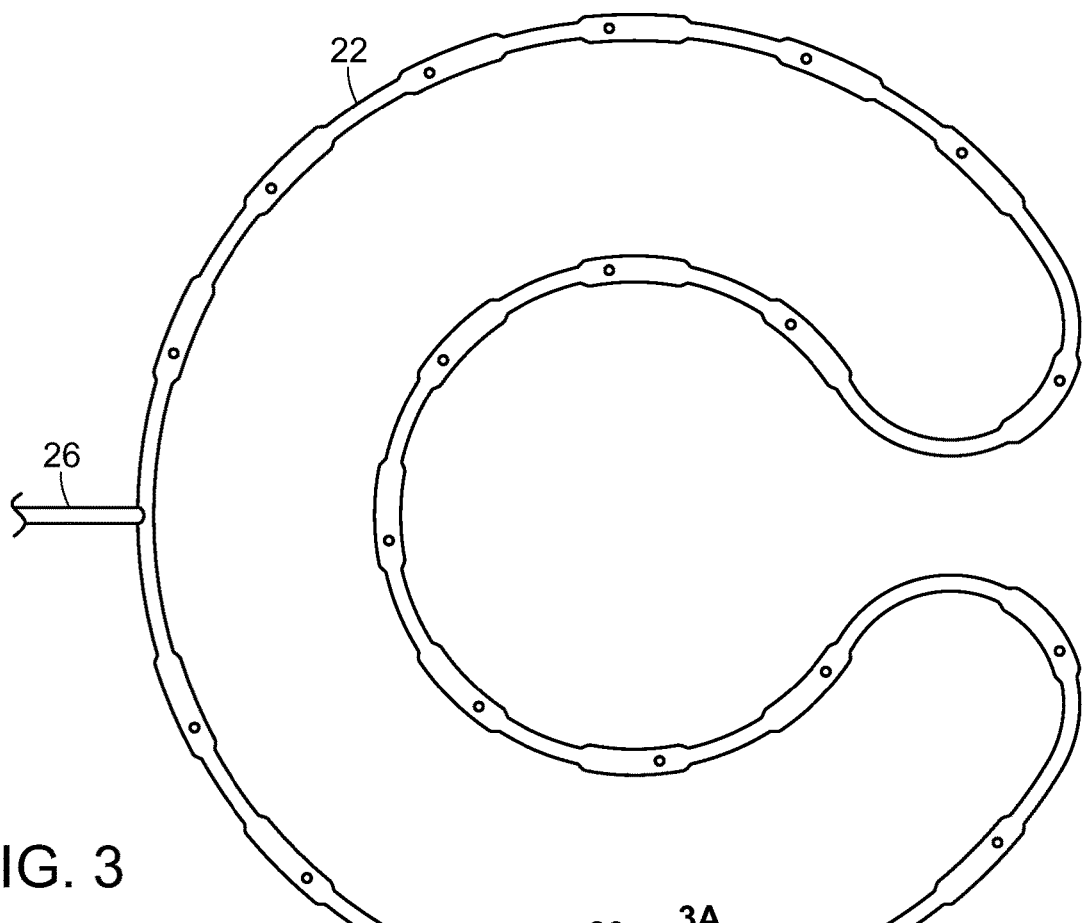
FIG. 3 is a top plan view of a drip tube having a plurality of water emitters embedded therein, in accordance with the present invention.
Figure 4:
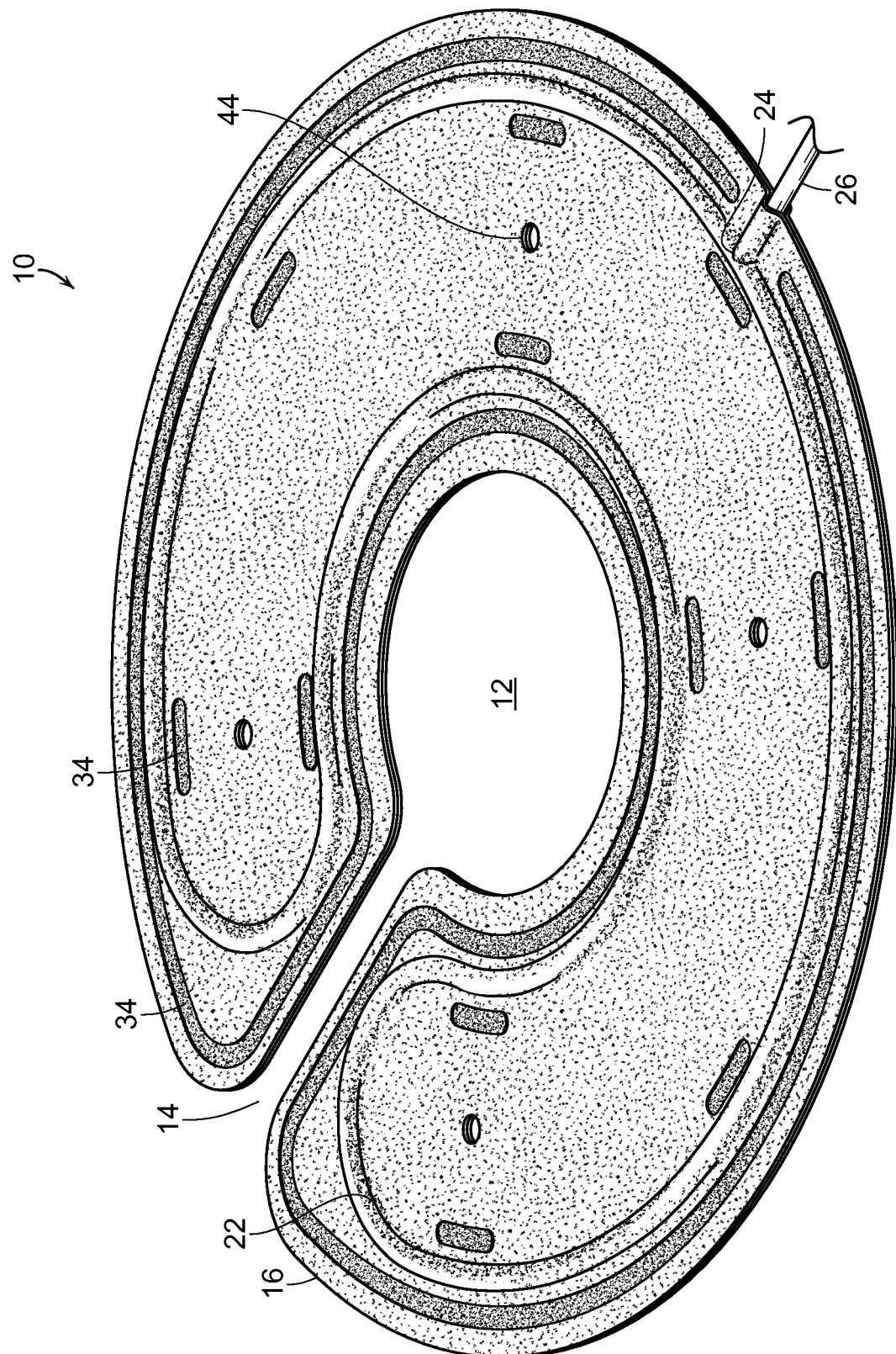
FIG. 4 is a top perspective view of an irrigation mat device embodying the present invention.

With reference now to FIGS. 1-4, a particularly preferred embodiment of the irrigation device of the present invention is shown. FIGS. 1 and 4 illustrate top perspective views of the device, which comprises a mat 10 in an assembled state having an opening 12, typically centrally located within the mat 10, through which a plant extends. A slit 14 extends between the opening 12 and an outer edge 16 of the mat, the slit enabling the mat 10 to be opened so as to facilitate placement of the mat 10 around an existing plant, such that a base of the plant extends through the opening 12. The mat is placed on a ground surface surrounding the plant so as to typically prevent weed growth around the plant, which would compete with the plant for water, nutrients and the like. Moreover, the mat 10 surrounds the plant so as to overlie a root zone of the plant and provide water and irrigate the root zone of the plant, without unnecessarily watering or irrigating areas between plants, which in conventional irrigation practices is wasted either due to evaporation, or promoting weed growth and the like.

The mat 10, as illustrated, is typically generally circular or C-shaped as most plants' root zones are below the plant. However, the device of the present invention is not limited to such a configuration and can have different configurations, as needed. Moreover, the mat device 10 of the present invention can be provided in differing sizes such that the central opening 12 is smaller or larger depending upon the plant the device 10 is to be used in association with, as well as having a smaller or larger overall diameter so as to accommodate different plants, shrubs, trees and the like.

With reference now to FIG. 2, the mat device 10 of the present invention is typically comprised of an upper first sheet of material 18 which is air and water permeable and a lower second sheet of material 20 which is also air and water permeable. These sheets of material 18 and 20 are cut to the desired size and configuration of the mat device 10. They also cooperatively form the central opening 12 and the slit 14.

The sheets of material 18 and 20 may be comprised of a landscape fabric, such as a geotextile fabric. Such fabrics can be non-woven and woven. The non-woven fabrics are often fabricated by using a spun-bonded method, which sandwiches melt-blown material. For example, polyethylene, polyester, polypropylene materials or combinations thereof may be spun-bonded to create a filter-type fabric which blocks sunlight and is sufficiently tight in nature so as to prevent weeds from growing, but also air and moisture permeable. Such may be in the form of a polypropylene fleece. Tightly woven mesh fabrics that are sufficiently strong and prevent weed or root growth therethrough, while still being air and water permeable may also be used. Such materials and fabrics provide distinct advantages over other materials, such as plastic. While sheets of plastic stop weeds, it also keeps air and water away from the soil, so plant-killing diseases develop. Landscape or geotextile fabrics used in accordance with the present invention facilitate air, water and moisture, and nutrient and healthy organism growth beneath the fabric so that the associated plant can grow and thrive. It will be appreciated that while both sheets of material 18 and 20 may inhibit root and weed growth therethrough, only one of the sheets of fabric 18 or 20 is required to have such characteristics and achieve the purposes of the present invention.

With continuing reference to FIG. 2, an irrigation drip tube 22 is sandwiched between the upper and lower sheets of material 18 and 20. As illustrated in FIG. 2, the drip tube 22 is formed into a configuration substantially that of the overall mat 10. As illustrated in FIG. 2, a single tube is bent into a generally C-shaped configuration, with sections of tubing being spaced apart from one another for enhanced water coverage, and the open ends being attached to a barbed tee connector 24. The tee connector 24 is connected to tubing 26 which is connected to a source of water. Thus, a closed-loop, which may be single, spaced apart, or spiraled or the like is formed between the upper and lower sheets of fabric material 18 and 20. The tube is typically comprised of flexible polyethylene, such as being one quarter inch in diameter, although different materials and sizes may be utilized.

Figure 3A:
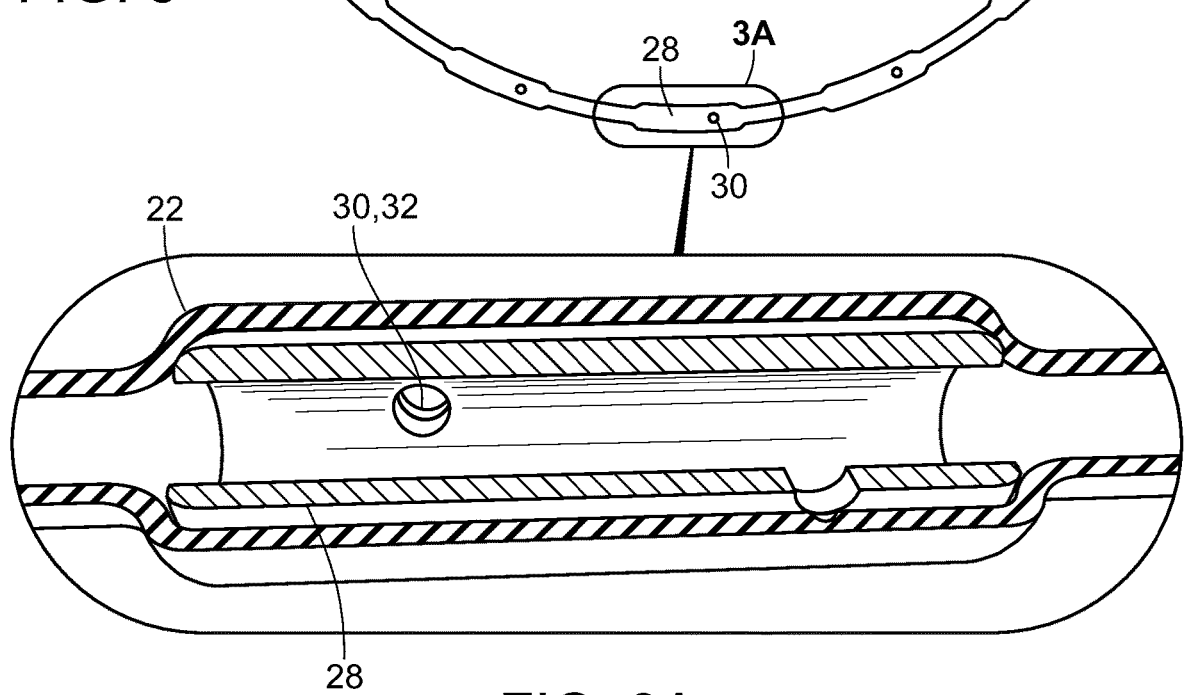
FIG. 3A is a cross-sectional view of area "3A" of FIG. 3, illustrating a water emitter within a drip tube, in accordance with the present invention.

With reference to FIG. 3, in a particularly preferred embodiment, emitters 28 are formed integrally with the tubing 22 which have outlets 30 which fluidly communicate with apertures 32 in the drip tubing 22 so that water can exit therethrough. The emitters 28 comprise a section of rigid tubing having a cross-sectional diameter which is larger than that of the drip tube 22. FIG. 3A illustrates a cross-sectional view of the relationship between the emitter 28 and the tubing 22. For convenience and clarity of illustration, the various drip tubes 22 illustrated herein do not show the emitters 28, although it will be appreciated that the embedded emitters can be incorporated into each of these embodiments and the use of the embedded emitters is a particularly preferred embodiment.

With continuing reference to FIG. 3, the emitters 28 may have certain desirable characteristics. For example, the emitter may be designed so as to be self-flushing, where sediment and debris is flushed through the emitter without clogging. In addition, or alternatively, the emitter 28 may also be pressure compensating in that it delivers a precise amount of water regardless of changes in pressure due to long rows, changes in terrain, or the like. In addition, or alternatively, the emitters 28 may also provide root intrusion barrier, in other words a physical or other deterrent which inhibits root intrusion into the emitter outlet, thus preventing clogging of the emitter 28. In addition, or alternatively, the emitter 28 may also have anti-syphon or vacuum breaker characteristics or features, so as to eliminate back-syphonage preventing debris from being drawn back into the emitter which would result in clogging. In addition, or alternatively, the emitters 28 may also have a check valve characteristic, which may be used in connection with the pressure compensating characteristics, in that the emitters would have a built-in check valve to keep the tubing charged with water at all times, eliminating leaking at the lowest point on shutdown.

With reference now to FIG. 4, in the illustrated embodiment, the upper and lower sheets of fabric material 18 and 20 are attached to one another so as to sandwich and retain the drip tube 22 therebetween. While this may be done in a variety of manner and used in a variety of methods, in a particularly preferred embodiment, as illustrated in FIG. 4, the first and second sheets of material 18 and 20 are heat fused to one another. Such a heat fusion weld 34 is typically formed adjacent to the inner and outer peripheral edges, as illustrated in FIG. 4. Other heat fusion welds 34 may be formed intermediate these inner and outer edges so as to retain the drip tube 22 in place and attach the sheets of fabric material 18 and 20 to one another. Heat fusing the sheets of material to one another has found to be an efficient and environmentally friendly way of forming the mat, and keeping the drip tube 22 in its desired location. Heat fusing the sheets 18 and 20 to one another avoids the cost and complications of stitching the sheets together, and avoids the environmental hazards and deleterious effects to the surrounding plants by using adhesives and the like. Moreover, heat fusing the outer perimeter prevents water from seeping out of the outer peripheral edge of the mat 10, and instead retains the water within the mat 10 so that it is directed downwardly into the ground and to the roots of the plant associated with the mat 10.

A method of fabricating the mat 10 illustrated in FIGS. 1-4 is to cut the upper and lower fabric layers 18 and 20 to the desired shape. A length of drip tubing corresponding to the size of the mat 10 is formed into the desired configuration with both ends being inserted into the barbed tee connector 24 so as to create a single open end and a closed loop. Typically, an additional section of tubing 26 is connected to the tee connector 24 for coupling to the water source. The drip tubing is placed onto the lower sheet of fabric 20, and the upper sheet of fabric is properly positioned over the lower sheet of fabric 20, such that the upper and lower sheets 18 and 20 are generally aligned with one another, whereupon heat fusion welds 34 are created that adhere the upper and lower sheets 18 and 20 to one another, sandwiching the drip tube 22 therebetween. FIG. 4 illustrates a completed irrigation mat device embodying the present invention utilizing this method.

Figure 5:
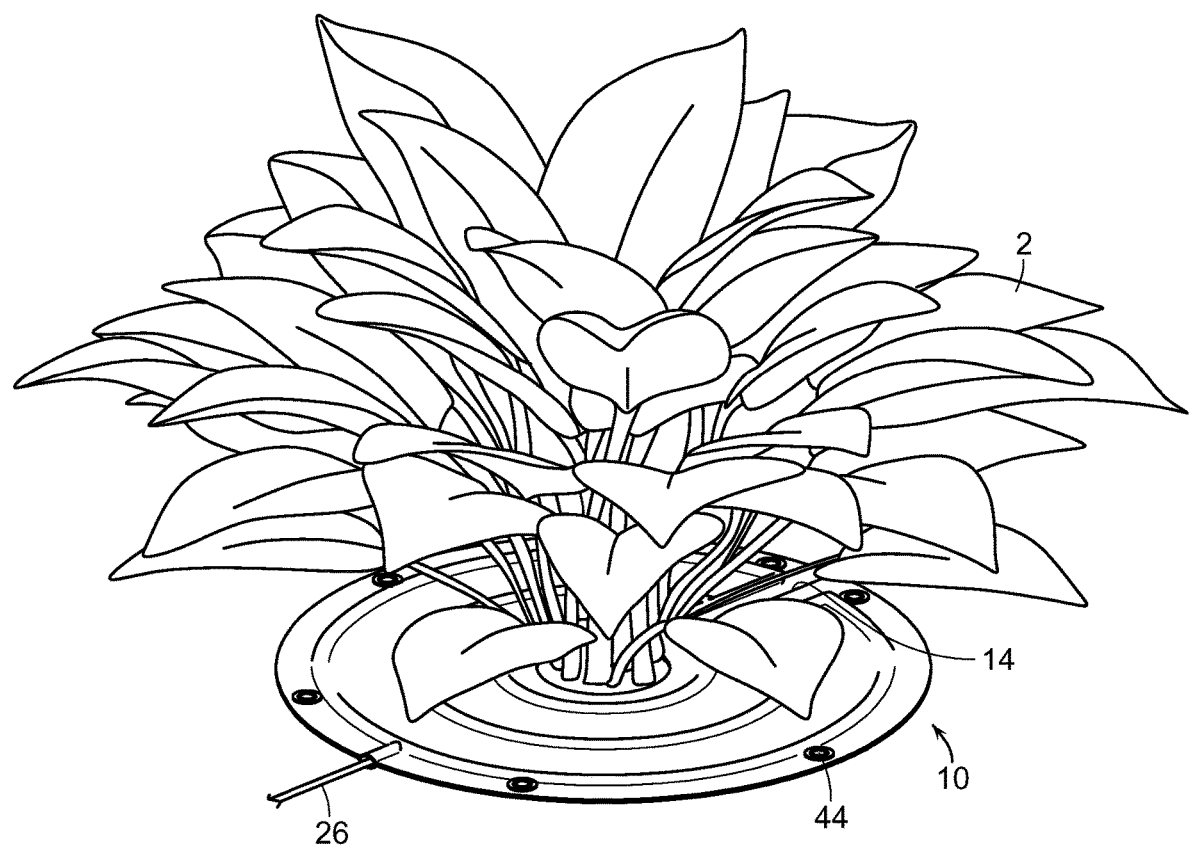
FIG. 5 is a perspective view of an irrigation mat device positioned around a plant, in accordance with the present invention.
Figure 6:
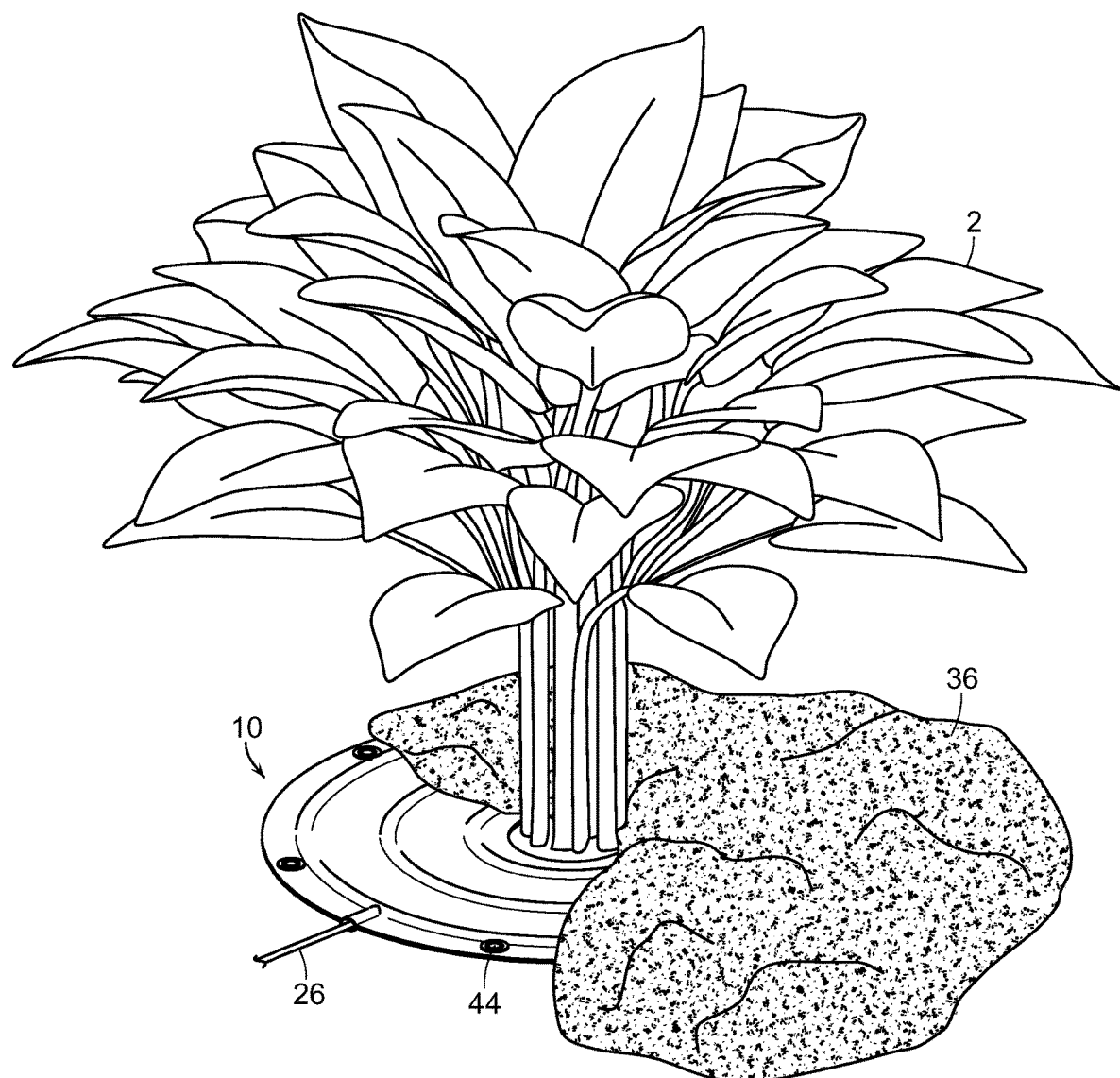
FIG. 6 is a view similar to FIG. 5, but illustrating mulch being placed over the mat, in accordance with the present invention.

With reference now to FIGS. 5 and 6, an irrigation mat device 10 embodying the present invention is shown disposed around the base of a plant 2, in accordance with the present invention. The area of the plant 2 which is covered by the mat device 10 will have weeds and roots inhibited from growing there. Moreover, as water is fed through tube 26 and into the mat device 10, water flows through the water emitters 28 and the drip tube, substantially soaking at least the lower sheet of fabric material 20 so that a substantially even amount of water is conveyed to the roots of the plant below the mat 10.

A covering material 36, such as mulch, gravel, decomposed granite or the like may be placed over the mat device 10, as shown in FIG. 6. This not only serves the purpose of providing an aesthetically pleasing look, but also further reduces evaporation of moisture and water from the mat 10.

With reference again to FIG. 2, where the plant 2 is within a section of lawn, a section of artificial turf 38 having a configuration matching that of the mat device 10 and also having an opening 40 through which the plant extends and a slit 42 for opening the section of artificial turf 38 so as to be disposed around the plant and over the mat may be utilized so as to give the appearance of a continuous area of lawn and turf, including immediately surrounding the plant.

Figure 7:
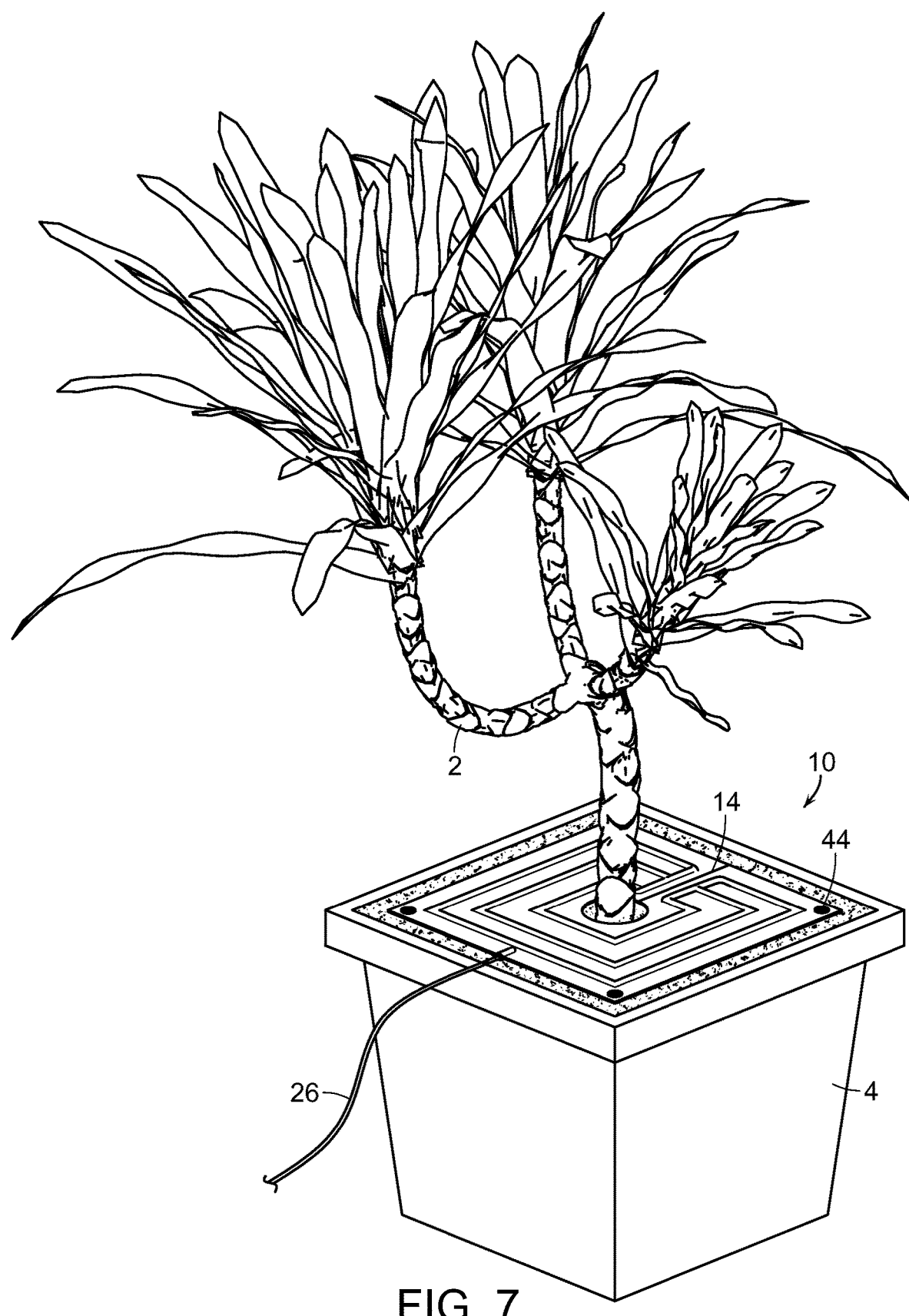
FIG. 7 is an environmental perspective view of a mat embodying the present invention designed to fit inside planting pots, in accordance with the present invention.

With reference now to FIG. 7, the irrigation mat device 10 of the present invention may not only be used in connection with plants which are planted and growing within the ground, but also within containers 4. Although the mat may be generally circular, it may also have a configuration substantially matching that of the container 4, such as being generally square as illustrated in FIG. 7. Such may be used individually for planters at a residence or business establishment, or it is also contemplated that a series of mats 10 embodying the present invention may be used with a large number of containers, such as at a nursery or the like. Use of the irrigation mat device 10 of the present invention with containers 4 provides the same advantages as with plants growing in the ground, namely, predictable water flow rates, efficient use of water while avoiding evaporation, and prevention of weeds.

With reference again to FIGS. 1 and 4, the irrigation mat devices 10 may include anchor apertures 44 formed therein for the insertion of pins or stakes or the like for holding the mat 10 in place. Such apertures may be surrounded by grommets 46.

Figure 8:
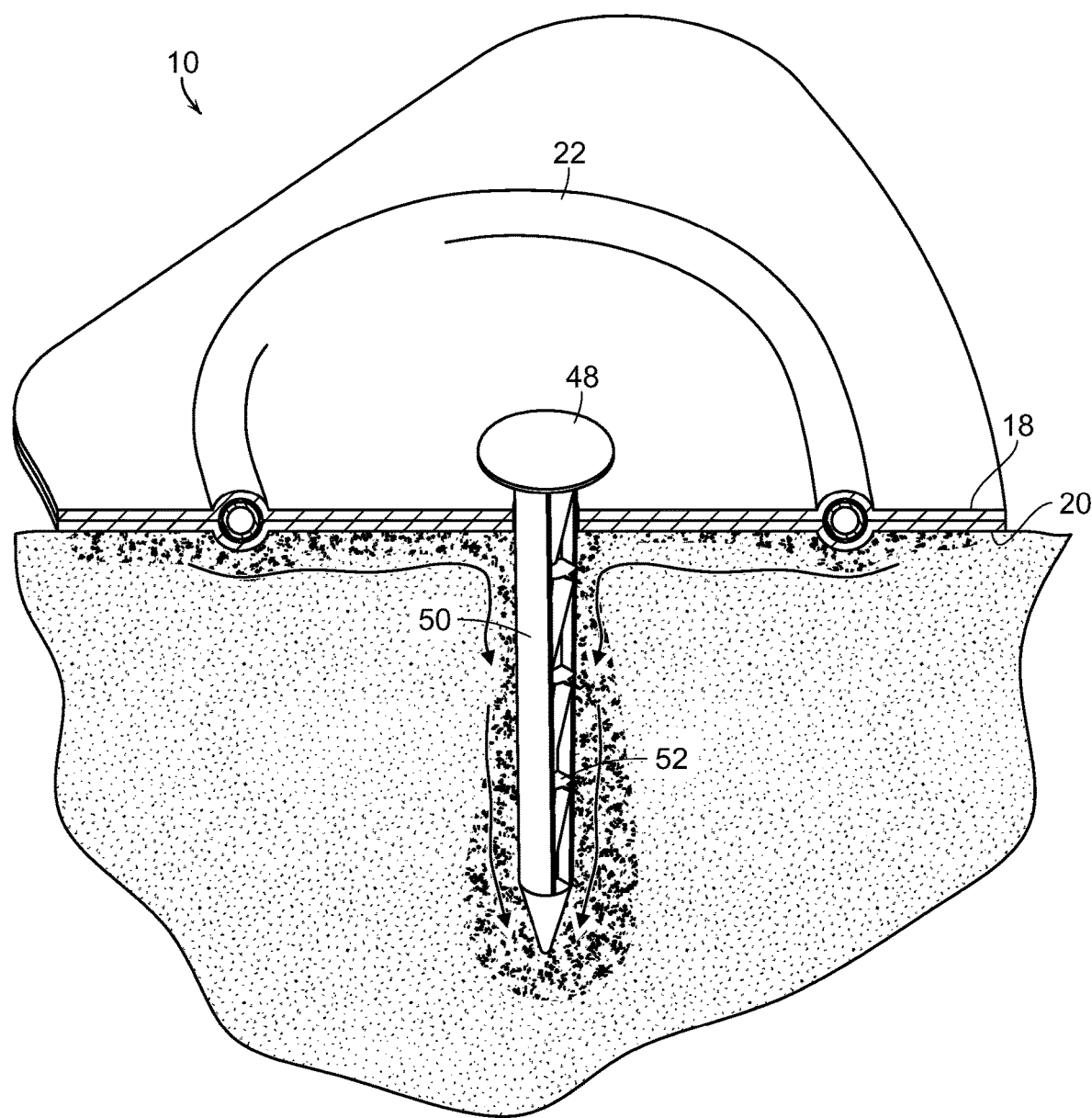
FIG. 8 is a diagrammatic cross-sectional view of an irrigation mat device disposed above ground and having a stake extending therethrough and channeling water into the ground, in accordance with the present invention.

With reference to FIG. 8, a stake 48 is shown extending through the mat 10, such as through anchor aperture 44, and into the ground below the mat 10. It has been found that the stakes 48 can serve to direct water from the mat 10 into the ground and towards the roots of the plant. The configuration of the stakes 48 may be such so as to facilitate this. The stakes may include channels 50 formed along the length thereof which serve to direct the water downwardly along the length of the stake, as shown by the directional arrows in FIG. 8. The stakes may also include upwardly directed barbs 52, which enable easy insertion of the stake into the ground, but resist the stake 48 being pulled from the ground as it is lifted, so as to retain the mat 10 in place.

Figure 9:
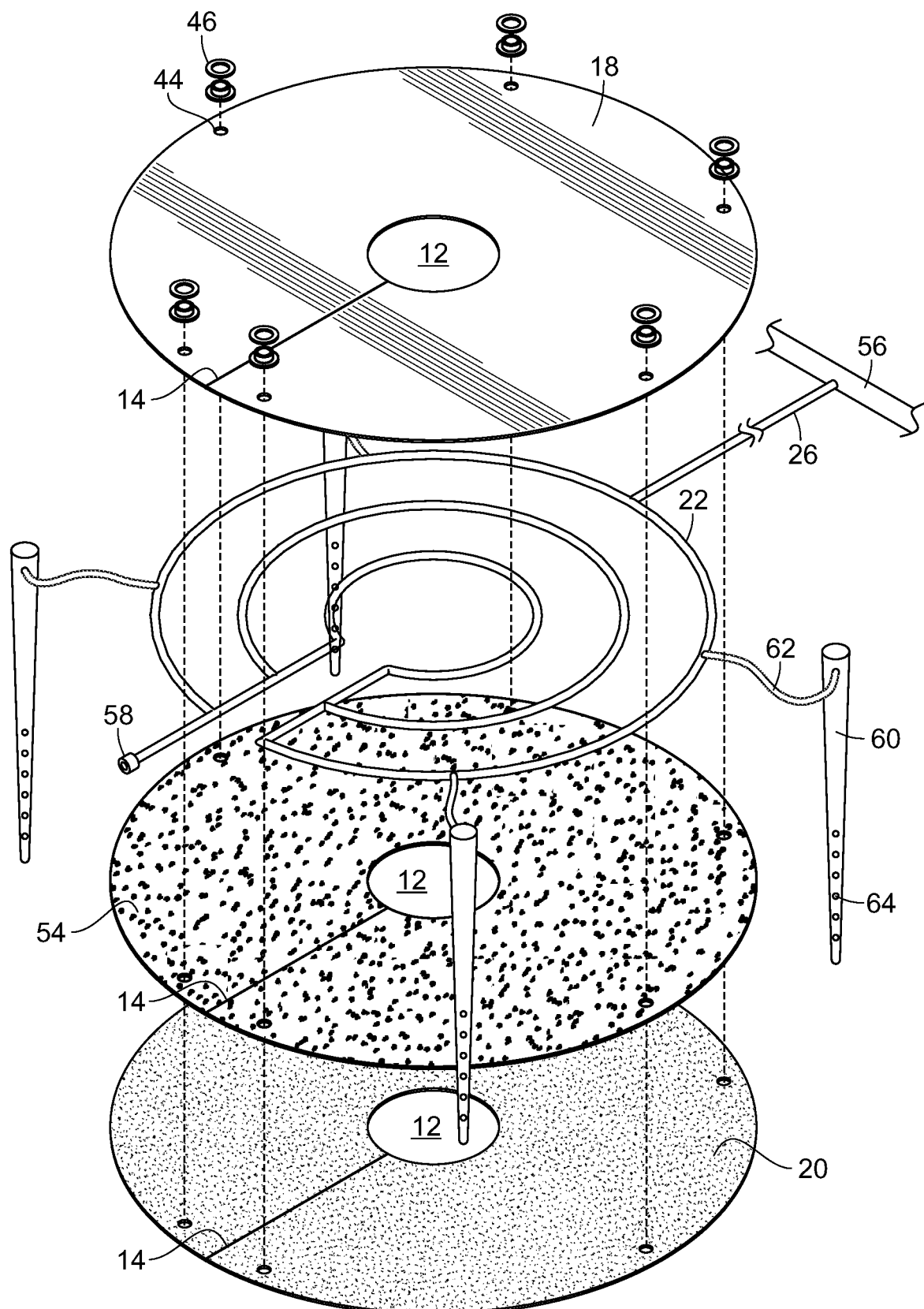
FIG. 9 is an exploded perspective view illustrating component parts that can comprise an irrigation mat device of the present invention.

With reference now to FIG. 9, a pad or layer of water dispersement material 54 may be disposed between the upper and lower sheets of fabric material 18 and 20 which can serve to capture the water emitted from the drip tube 22 and evenly distribute the water to the lower surface material 20, or alternatively or in addition to have water retention properties so as to retain water and more slowly provide the water for irrigation purposes over a prolonged period of time as it seeps through the material 54 and lower fabric layer 20 by either gravitational forces or by virtue of the underlying ground being drier than these materials and wicking away the water. Polymers, including polymer sand or gels, may be added to increase water-holding properties of the mat.

FIG. 9 also illustrates the drip tube 22 operably connected to a main line 56 tube which provides water to individual mats 10. Moreover, although the emitters 28 are self-flushing in nature, there may arise circumstances where additional flushing is necessary or the emitters are not used, and thus a flushing valve 58 may be provided at an end of the drip tube 22 which would allow the drip tubing to be cleared of debris that may accumulate therein.

Figure 10:
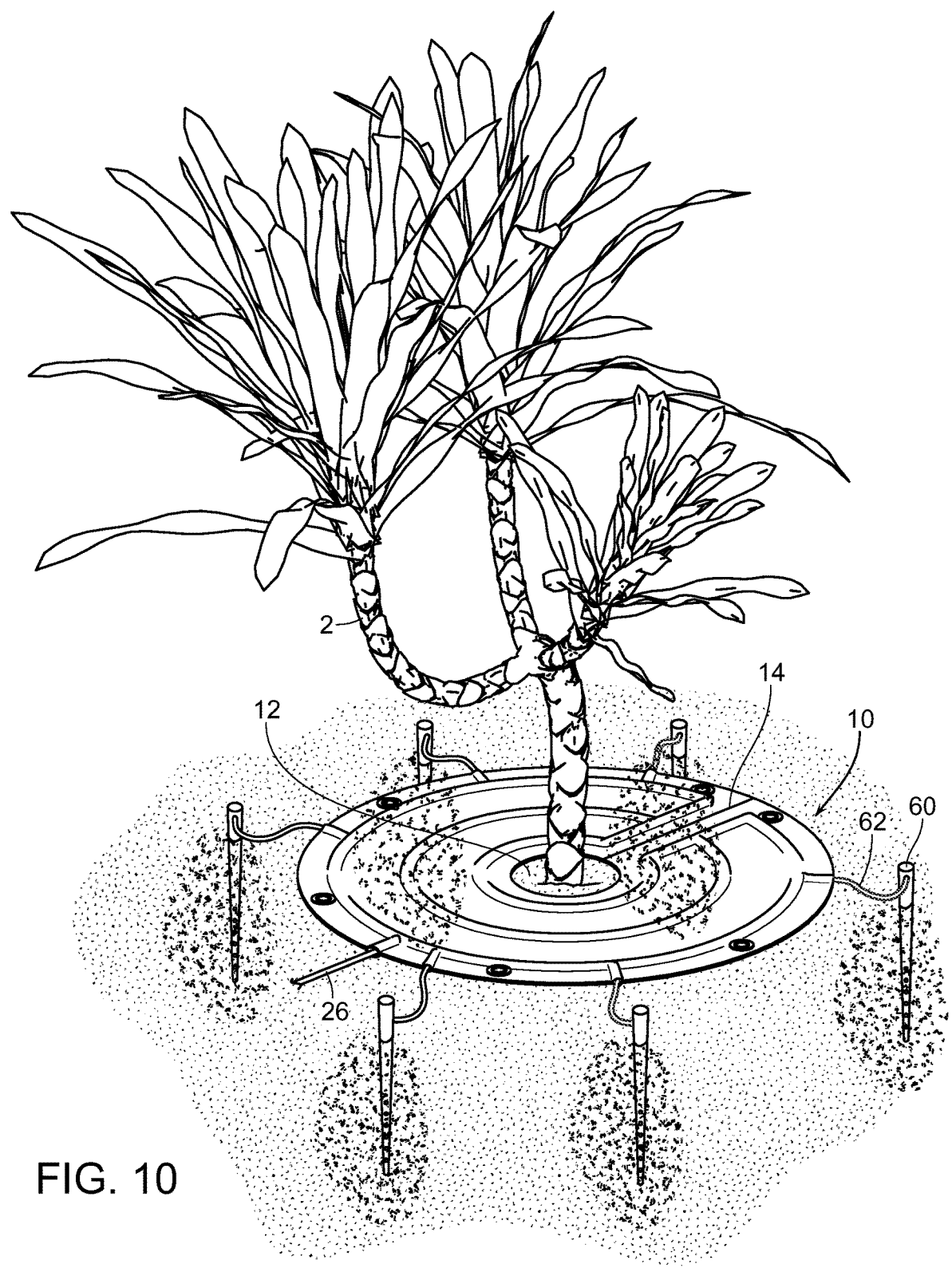
FIG. 10 is an environmental view of an irrigation mat device having deep watering stakes, in accordance with the present invention.

With reference to FIGS. 9 and 10, it is contemplated by the present invention that hollow stakes or other similar deep watering devices 60 be operably connected to the drip tube 22 of the mat 10, such as by connecting tubes 62. These hollow stakes or watering members 60 are hollow and have at least one water outlet 64 formed towards a lower end thereof. Typically, a series of outlet apertures 64 are formed in the wall of the stake 60. This allows water to be conveyed to areas that might not otherwise be dispersed by the mat, such as an area extending beyond the mat device 10, or as a means of delivering water deeper into the ground and towards the roots of the plant 2 in a more speedily manner. Such hollow stake device watering members 60 may be used instead of the emitters 28 within the drip tube so as to be the only source of water, or may be used in addition to the water emitters 28 and the drip tube 22.

Figure 11:
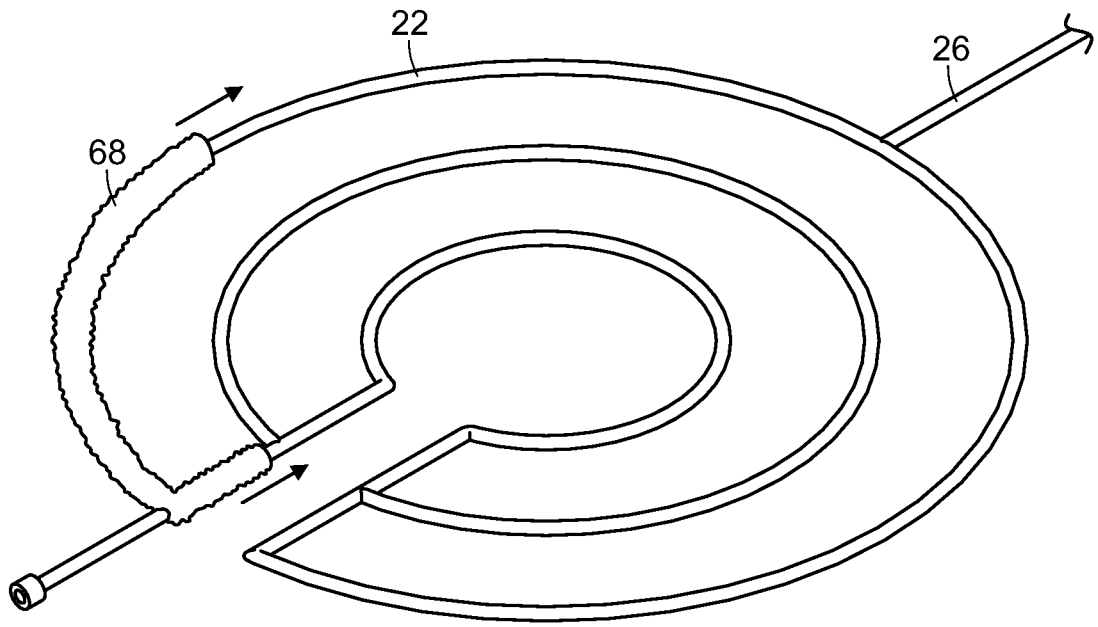
FIG. 11 is a top perspective view of a drip tube used in accordance with the present invention, and having a water dispersing sleeve wrapped around the tubing.

With reference now to FIG. 11, it is contemplated that the drip tubing 22 may be comprised of perforated soaker hose, or comprised of a material which slowly releases water therefrom. Alternatively, as illustrated in FIG. 11, a sleeve 8 may be wrapped around the drip tubing, which is comprised of fleece or other material which has water holding and dispersement properties. The sleeve 68 may replace the water dispersement pad or material 54. The sleeve 68 would become soaked along a length thereof, and serve to disperse water along the entire length of the sleeve, and not only at the water outlet apertures of the emitters 28. However, the lower surface fabric material 20 can be selected such that it will substantially become soaked by the spaced apart water emitters 28 and substantially uniformly disperse water therefrom, whether such water is obtained from the water emitters 28 directly, apertures formed in the drip tubing 22, sleeves 68, or a water dispersement pad or material, such as sand or encapsulated polymer sand.

Figure 12:
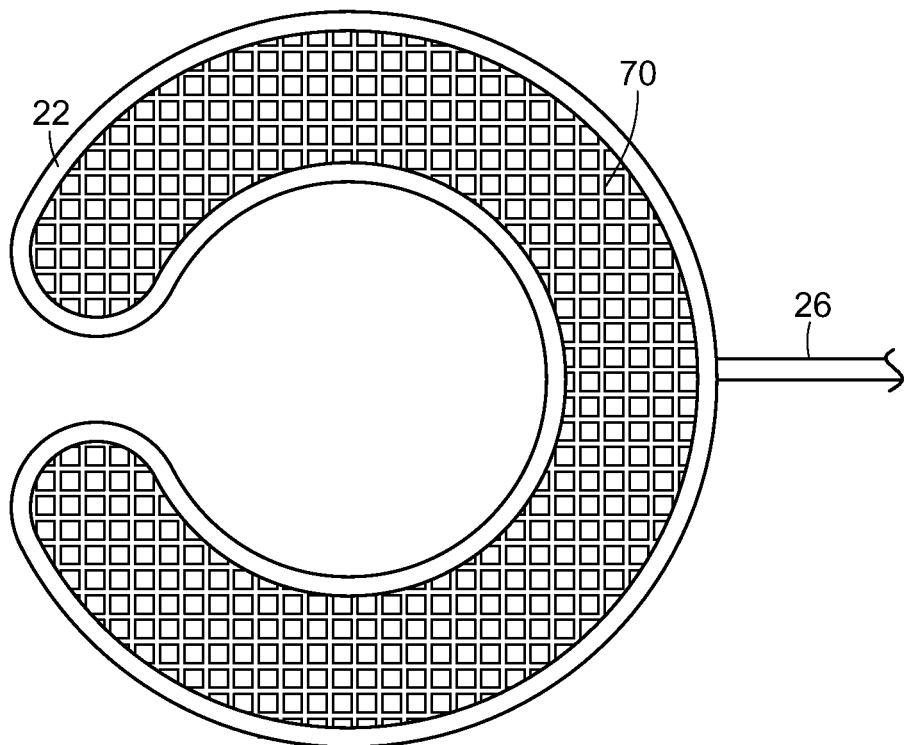
FIG. 12 is a top plan view of drip tubing having netting attached thereto, in accordance with the present invention.

With reference now to FIG. 12, it is contemplated by the present invention that the drip tubing 22 be attached to a support, such as the illustrated netting 70. The netting 70, typically comprised of plastic, functions to hold the tubing 22 in the shape of the plant watering mat 10 and prevent the tubes 22 from coming close together and also retaining their desired shape and configuration.

Figure 13:
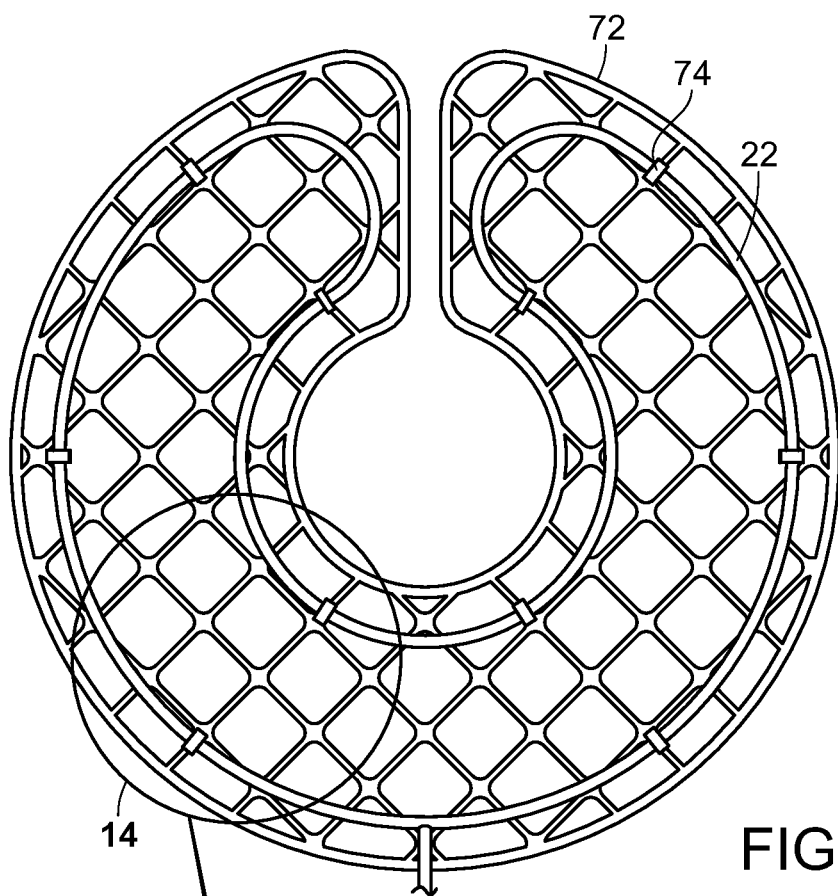
FIG. 13 is a top plan view of a support having a drip tube attached thereto, in accordance with the present invention.
Figure 14:
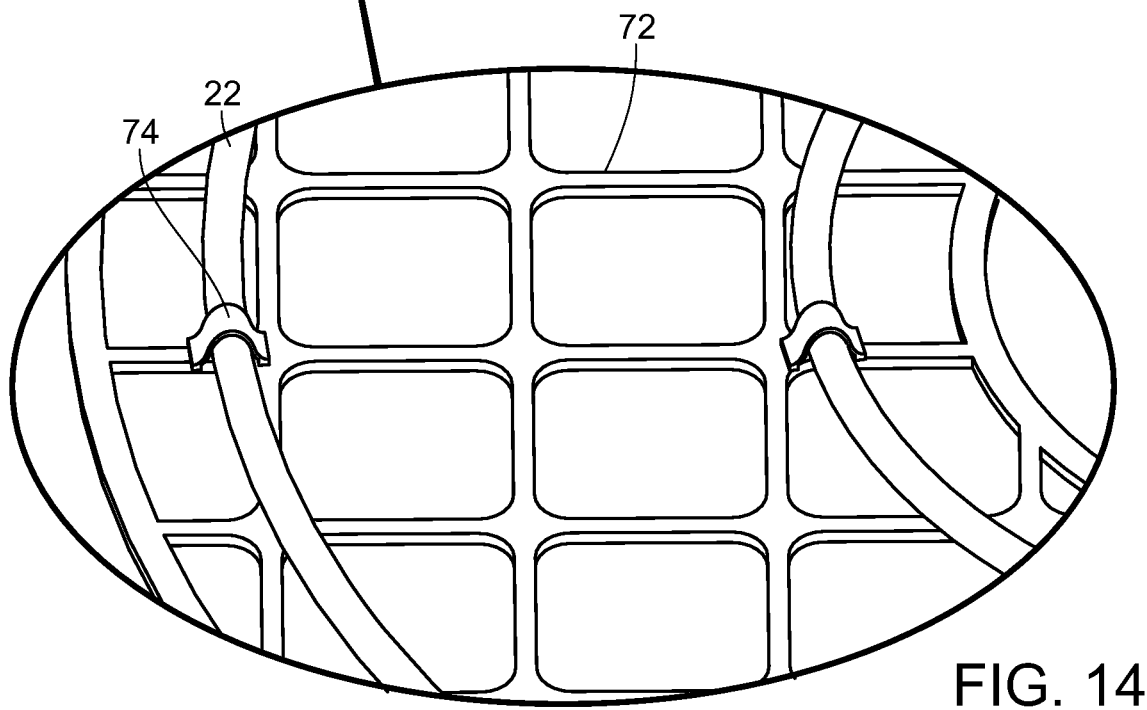
FIG. 14 is an enlarged view of area "14", illustrating the drip tube clipped to the support.

With reference to FIGS. 13 and 14, another support 72 is shown having a waffle-like configuration with a meshwork forming large apertures therein. The drip tubing 22 in this case is attached to the support 72, such as by means of clips 74 or other retaining means which holds the tubing 22 to the rigid support 72 in place, in a desired shape and configuration. Such clips 74 could also comprise ties or fasteners which can be selectively mounted to both the support 72 and the drip tube 22 so as to create different configurations as deemed necessary.

Figure 15:
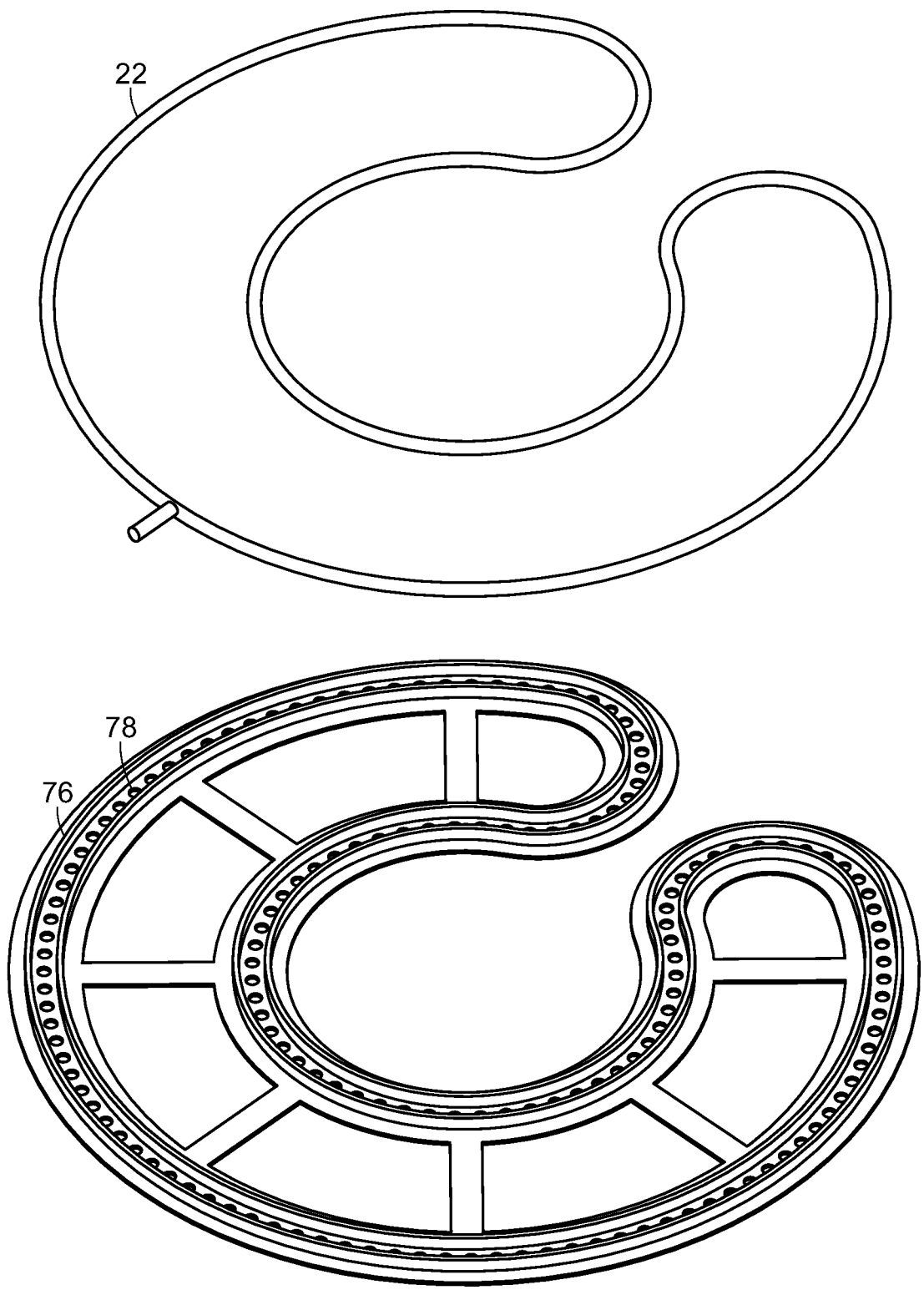
FIG. 15 is an exploded perspective view of a drip tube which is received within an open-face channel of a support, having a plurality of water outlet apertures formed along a length thereof, in accordance with the present invention.
Figure 16:
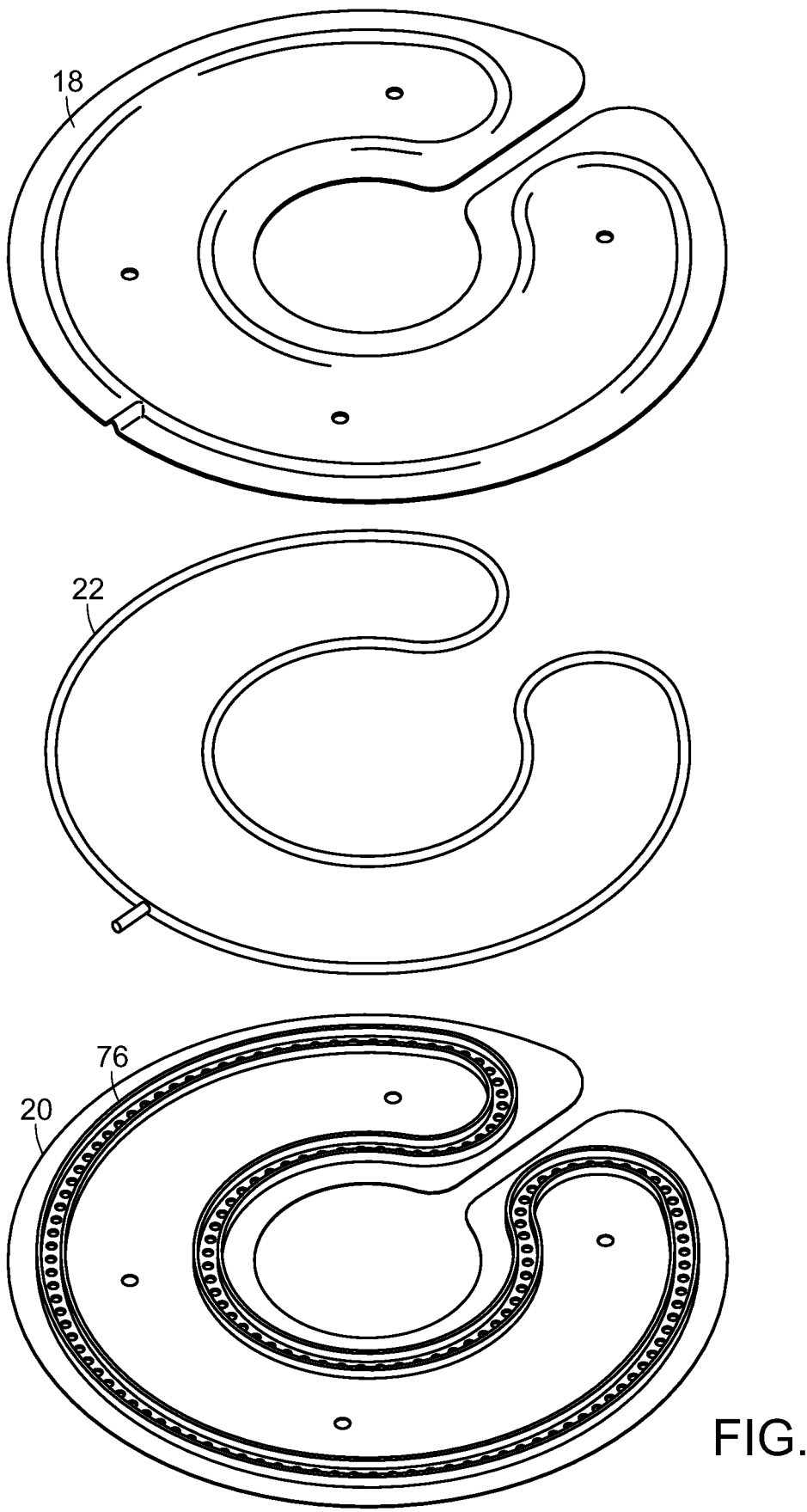
FIG. 16 is an exploded perspective view similar to FIG. 15, but illustrating sheets of material sandwiching the drip tube and support channel.

With reference now to FIGS. 15 and 16, yet another support 76 in the form of a rigid, open-faced channel is shown. The channel has a diameter and size which enables the drip tubing 22 to be placed therein and held in place. The rigid channel 76 is molded or otherwise formed in the desired configuration of the drip tube 22. A series of apertures 78 are formed in the channel to serve as water outlet apertures as water is emitted from the drip tube 22, such that the water may be conveyed to the other portions of the mat and/or ground surface. The supports illustrated in FIGS. 12-15 may be sandwiched within the upper and lower layers 18 and 20 of fabric material to form part of the mat.

Figure 17:
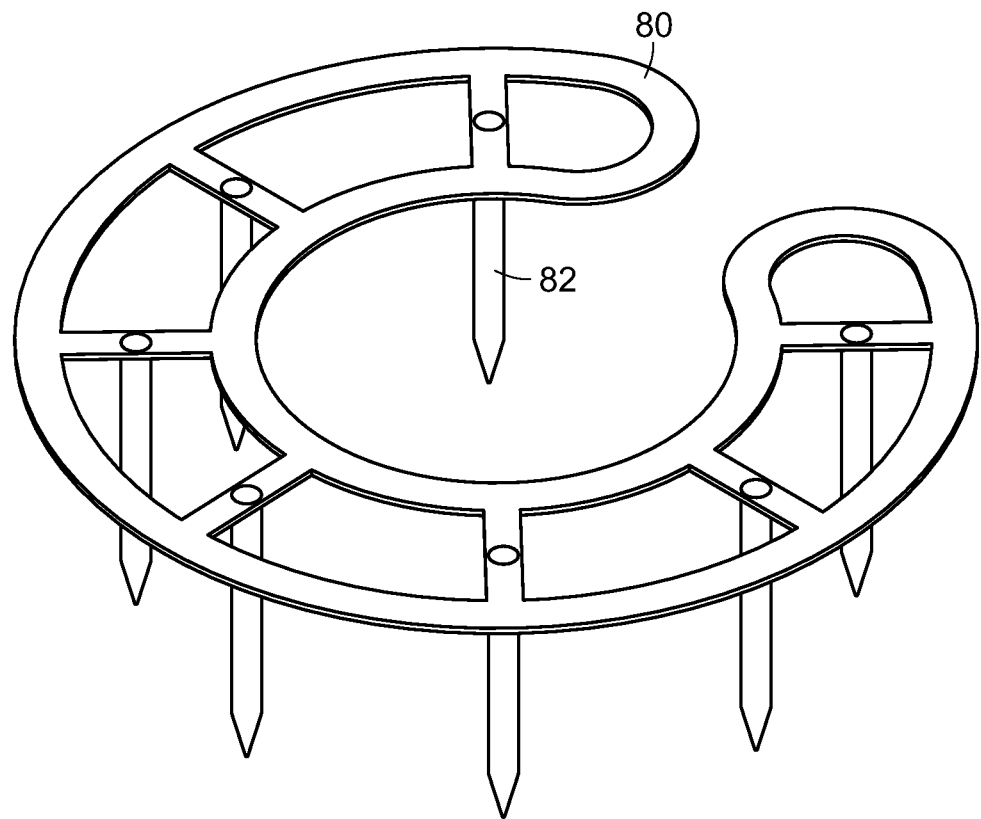
FIG. 17 is a perspective view of a rigid support structure having a plurality of hollow spikes extending downwardly therefrom, in accordance with the present invention.
Figure 18:
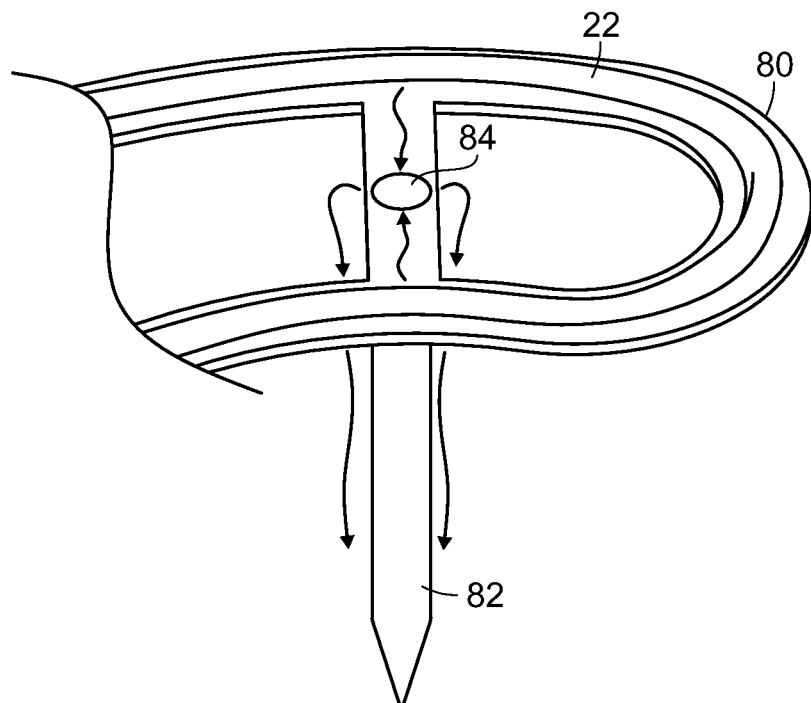
FIG. 18 is an enlarged view of a drip tube and spike of FIG. 17.

With reference now to FIGS. 17 and 18, yet another support 80 is shown, with integrally formed stakes in the form of hollow water directing members 82. As can be seen in FIG. 18, water, shown by the directional arrows, flows from the drip tube 22, positioned on the support 80, into an open end or inlet 84 of the water directing member 82, such that the water flows down into the water directing member and subsequently flows out of the water directing member, such as through outlets thereof. This provides a means for directing water deeper into the ground and towards the roots of the plant in an efficient manner.

Figure 19:
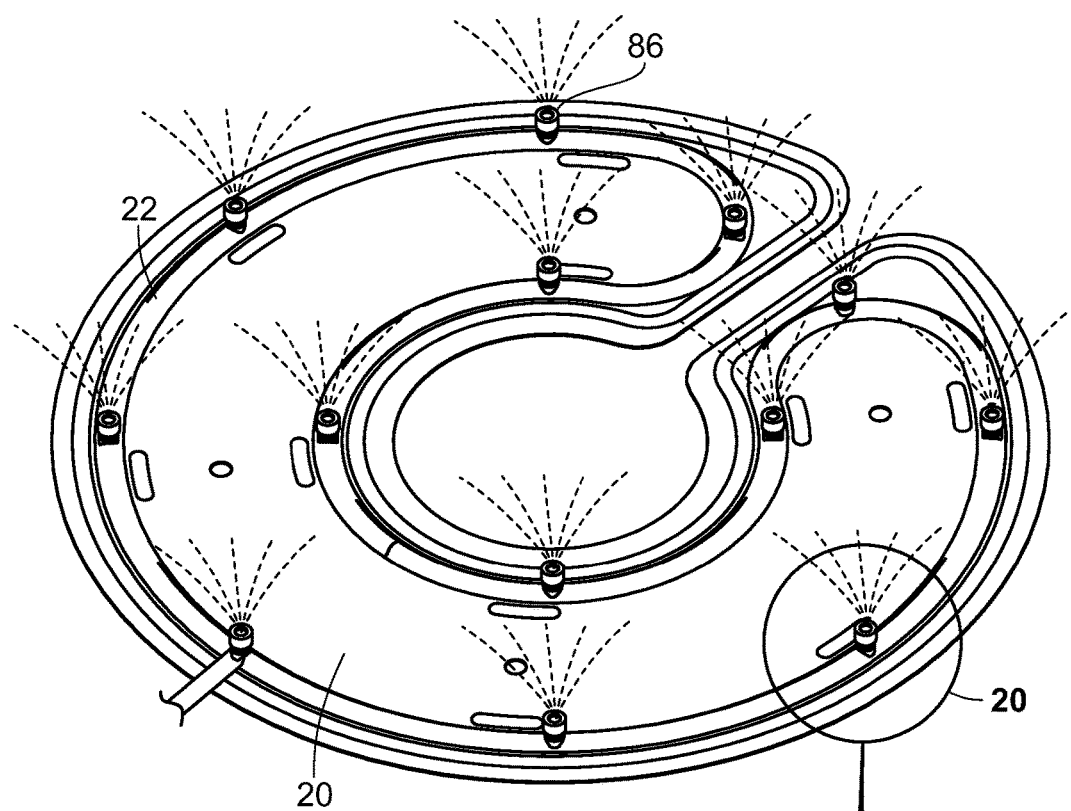
FIG. 19 is a top perspective view of an irrigation mat device embodying the present invention having water spray emitter nozzles, in accordance with the present invention.
Figure 20:
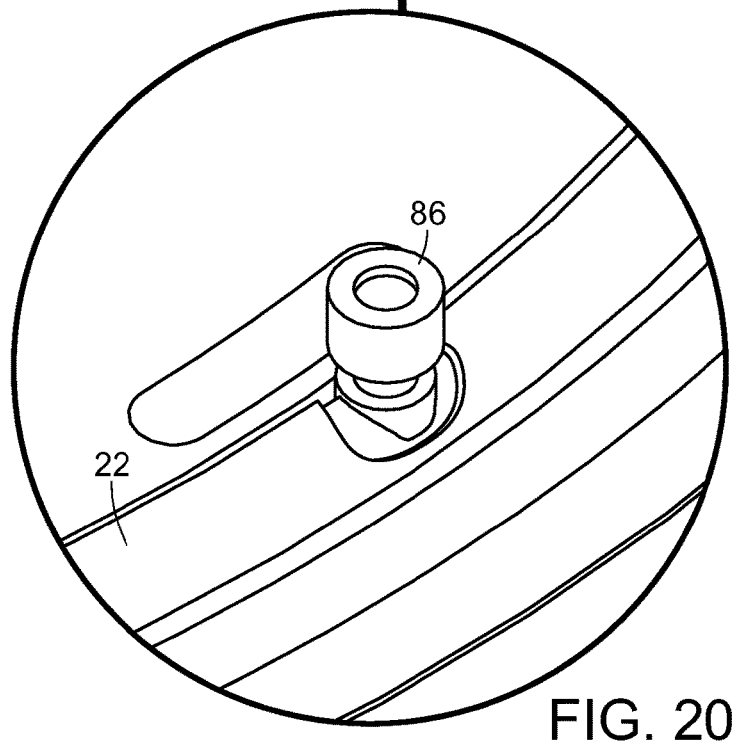
FIG. 20 is an enlarged view of area "20" of FIG. 19, illustrating an emitter.

With reference now to FIGS. 19 and 20, the invention contemplates the use of spray water emitter nozzles which are operably connected to and extend from the tubing 22 and either drip water therefrom or spray water therefrom. Although such nozzles 86 could be sandwiched between the upper and lower layers of sheets of fabric material 18 and 20, it is also contemplated that only a lower sheet of fabric material 20 would be used, wherein the tubing 22 and spray nozzles 86 are disposed thereon, such as illustrated in FIG. 19. This embodiment would serve to spray water onto the lower sheet of fabric material 20 as well as an area surrounding the mat. The lower sheet of material 20 could have the same characteristics as described above with respect to air and water permeability, yet preventing roots and weeds growing therethrough.

Figure 21:
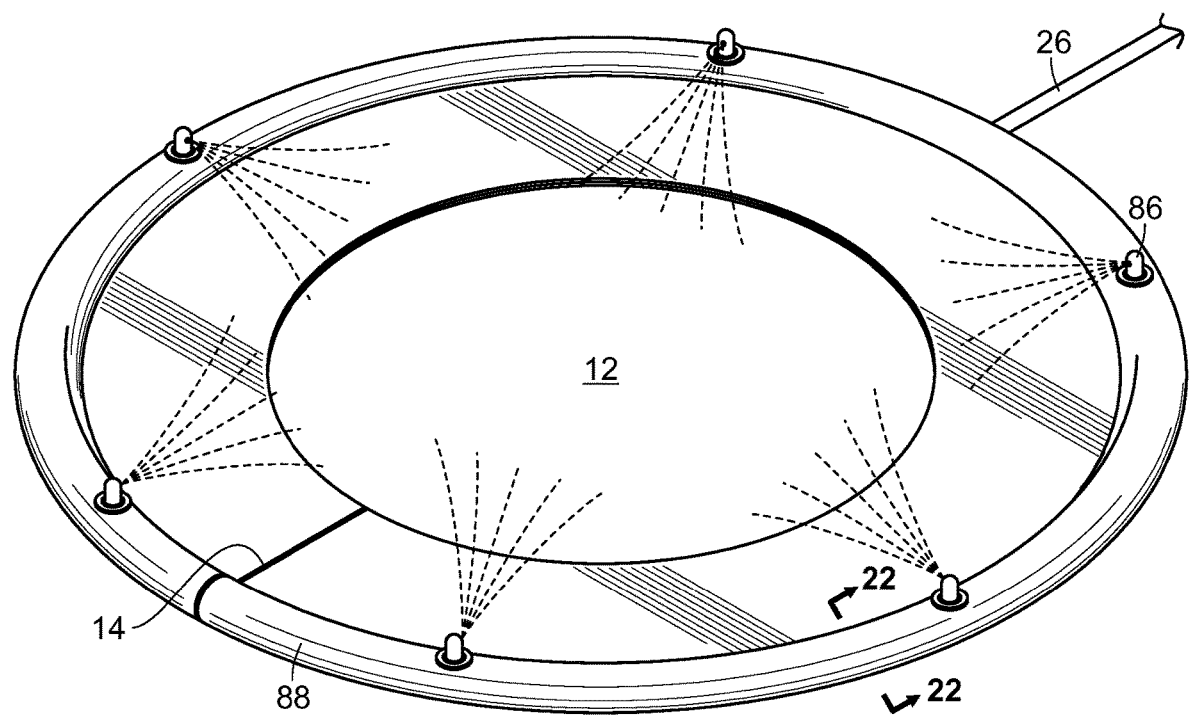
FIG. 21 is a top perspective view of another irrigation mat device embodying the present invention and having water emitters.
Figure 22:
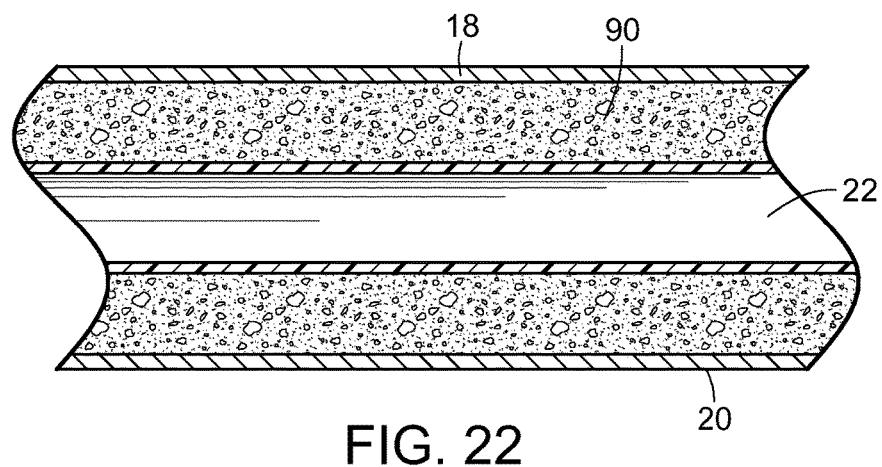
FIG. 22 is a cross-sectional view taken generally along line 22-22 of FIG. 21, illustrating a tube within the irrigation mat device.

With reference now to FIGS. 21 and 22, yet another embodiment of the irrigation mat device of the present invention is shown, wherein spray emitter nozzles 86 are operably attached to the tubing 22 and extend through a weighted collar 88. The weighted collar 88 is typically disposed around an outer peripheral edge of the mat and serves to hold the mat in place. As illustrated, the water spray nozzles 86 may direct water inwardly towards the opening 12 and the plant. As illustrated in FIG. 22, the mat is still comprised of the upper and lower sheets of material 18 and 20, but around the peripheral edge defining the weighted collar 88 material, such as sand or other such material 90 fills the collar 88 and gives it sufficient weight to hold the mat in place and support the spray nozzles 86.

The spray nozzles 86, such as illustrated in FIGS. 19-21, can comprise retractable pop-up nozzles. The water emitting nozzle would be attached to a neck or the like, which extends upwardly in the presence of water pressure such that the nozzle of the spray nozzle 86 is raised above the uppermost layer of the drip tubing or mat, but which retracts when the water pressure is absent, so as to retract closer to or even into the drip tube.

Figure 23:
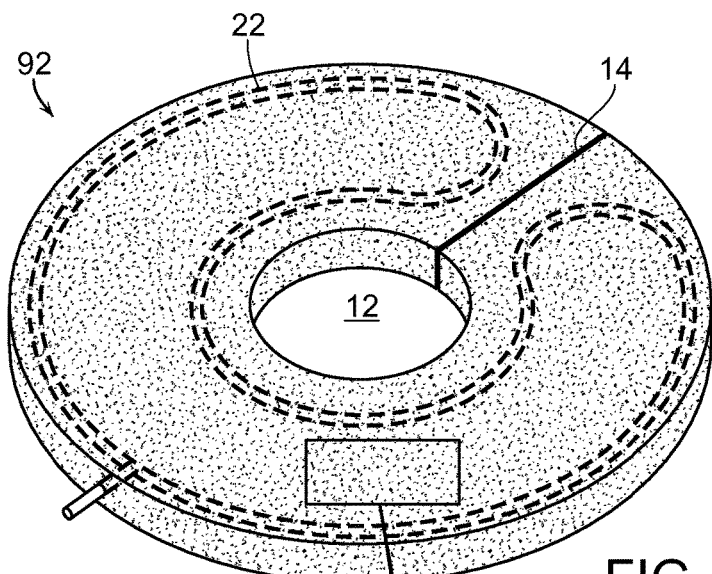
FIG. 23 is a perspective view of another irrigation mat embodying the present invention.

With reference now to FIG. 23, yet another irrigation mat device 92 is shown with a central opening or aperture 12 and a slit 14 and having the drip tube 22 disposed therein. The mat is comprised of a water and air permeable molded or fused material in which the drip tube 22 is suspended. The air and water permeable material may be injected, fused, or the like. It may be comprised of a molded gel, woven material, organic material, foam, biodegradable material, felt, polymer, coir, or the like. It may have ultraviolet resistant and/or chemical resistant properties.

Figure 23A:
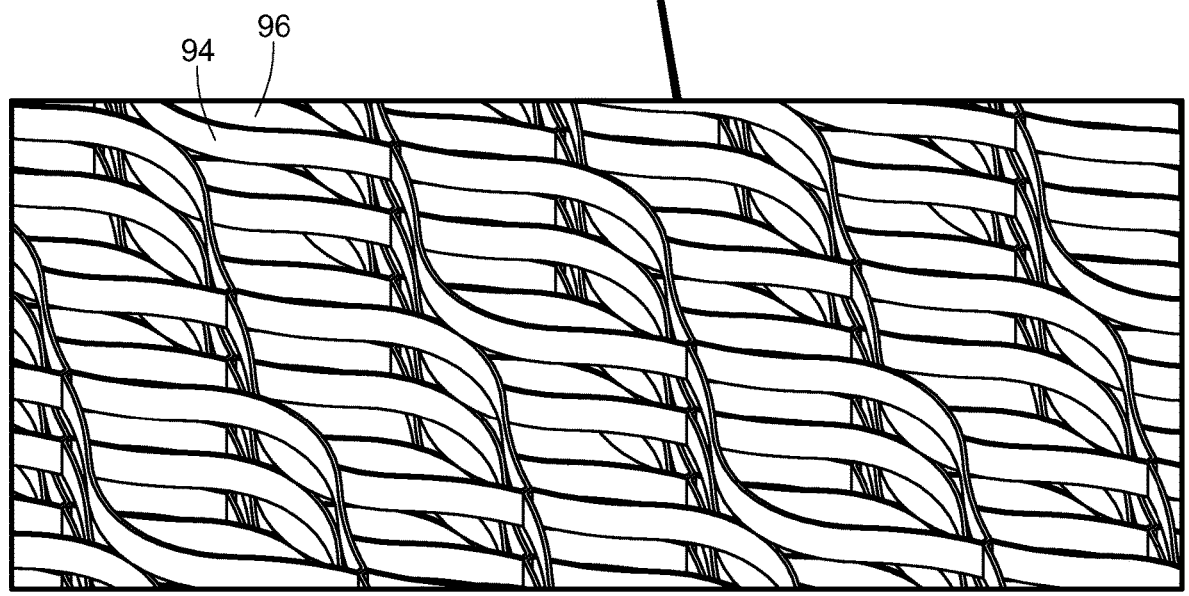
FIG. 23A is an enlarged perspective view of an area of FIG. 23, illustrating an open weave nature of one embodiment of the mat.

With reference to FIG. 23A, instead of being comprised of a material which inhibits roots or plants from growing therethrough, the mat 92 may be comprised of a material which allows roots and plants to grow therethrough. Such might be the case, for example, in an area where there is lawn or turf or even wild grasses or other plants in which the grass or other plants are desired to grow around the tree, shrub or other plant which is irrigated by means of the mat 92. Thus, for example, instead of utilizing the artificial turf 38 in FIG. 2, the mat 92 of FIG. 23 could be used and grass allowed to grow therethrough over time. As illustrated in FIG. 23A, the mat is comprised of a material 94 which is woven to create openings and passageways 96 to permit roots and plants to grow therethrough. The material 94 may be a honeycomb filter-type material. The material comprising the mat 92 is woven or otherwise formed in such a manner so as to create the passageways to permit roots and plants to grow therethrough.

Figure 24:
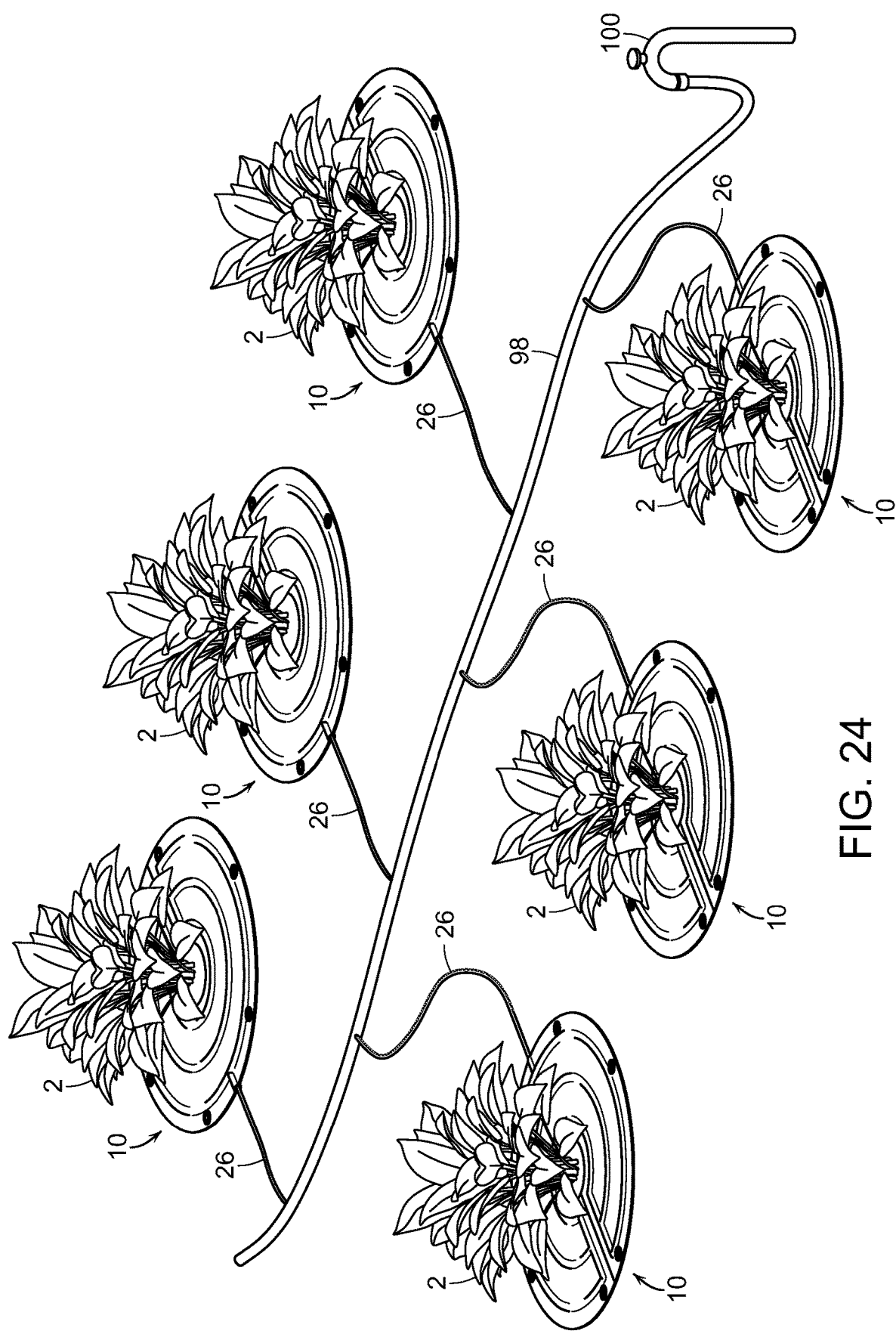
FIG. 24 is an environmental view of a plurality of irrigation mat devices connected together as part of an irrigation system, in accordance with the present invention.

With reference now to FIG. 24, an environmental view is shown of multiple irrigation mat devices 10 embodying the present invention operably placed around a plurality of plants 2 and connected to a main line 98 of a water source 100, such as a spigot or the like. The main line 98 may be a hose or tube to which the smaller lines 26 extending from the mats 10 may be connected. This may be, for example, by means of T-junctions or any other means of fluidly coupling the tubes and lines to one another. In this manner, when the main source of water 100 is opened, all of the mats 10 receive water, and thus irrigate the plants, creating an irrigation system which waters the plants simultaneously.

Figure 25:
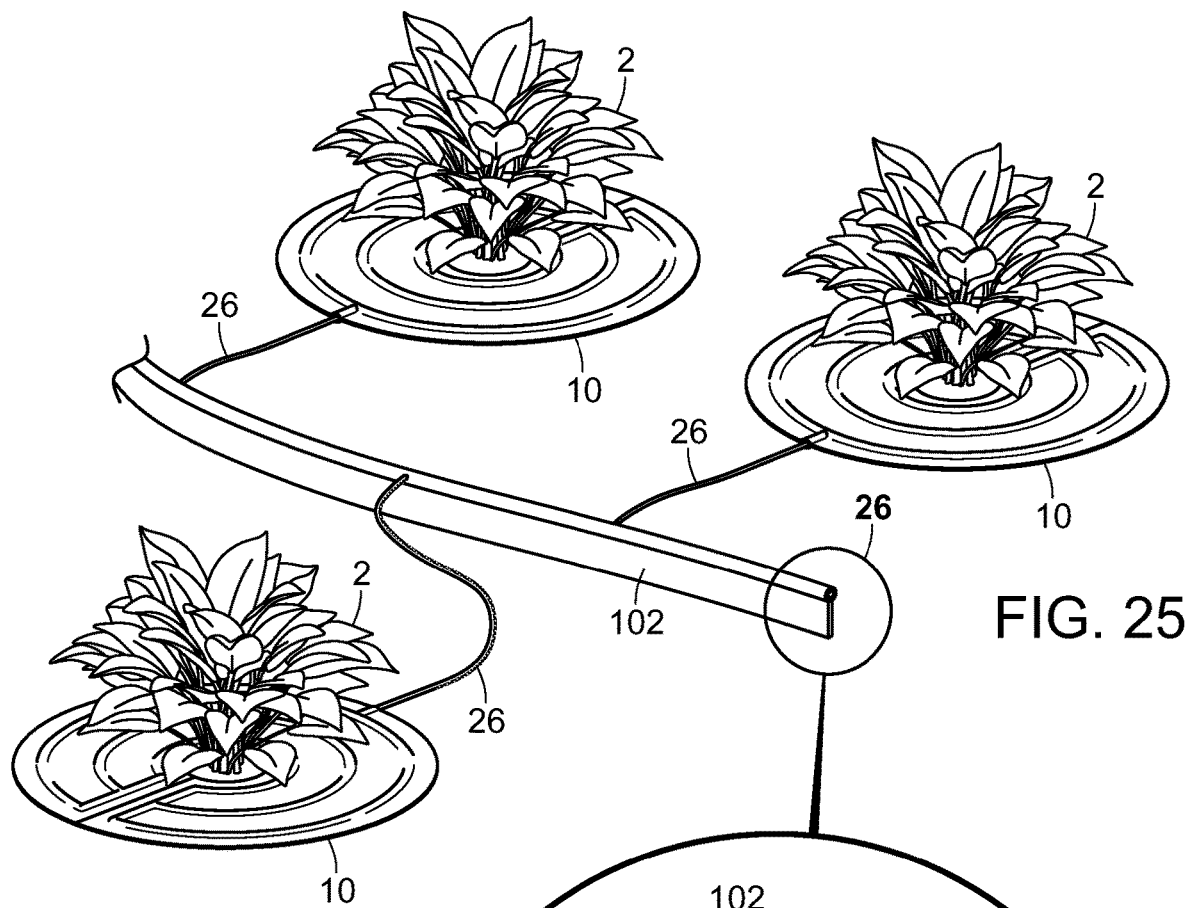
FIG. 25 is an environmental view of another irrigation system, illustrating a water conveying edging, used in accordance with the present invention.
Figure 26:
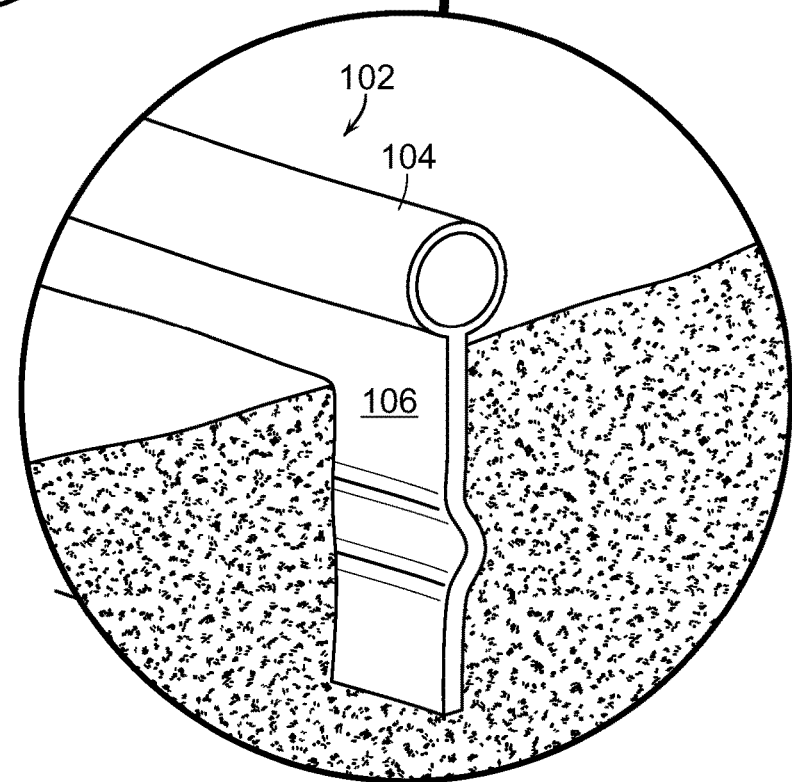
FIG. 26 is an enlarged view of area "26" of FIG. 25.

With reference now to FIGS. 25 and 26, another irrigation system is shown, but in this case instead of a larger tube or hose being utilized, the tubes or lines 26 extending from mats 10 are operably connected to landscape edging 102. The landscape edging includes a hollow tube 104 at a crown of a blade 106 thereof which extends into the soil or ground. The hollow tube 104 can convey water to supply to the mats 10, while the blade 106 inserted into the soil presents an edge which prevents plant material from growing from one area into another, such as around the boundary of a garden bed and grass, for example. Utilizing such landscaping edging 102 can also be used to securely place the source of water in the ground which will not be easily moved.

Figure 27:
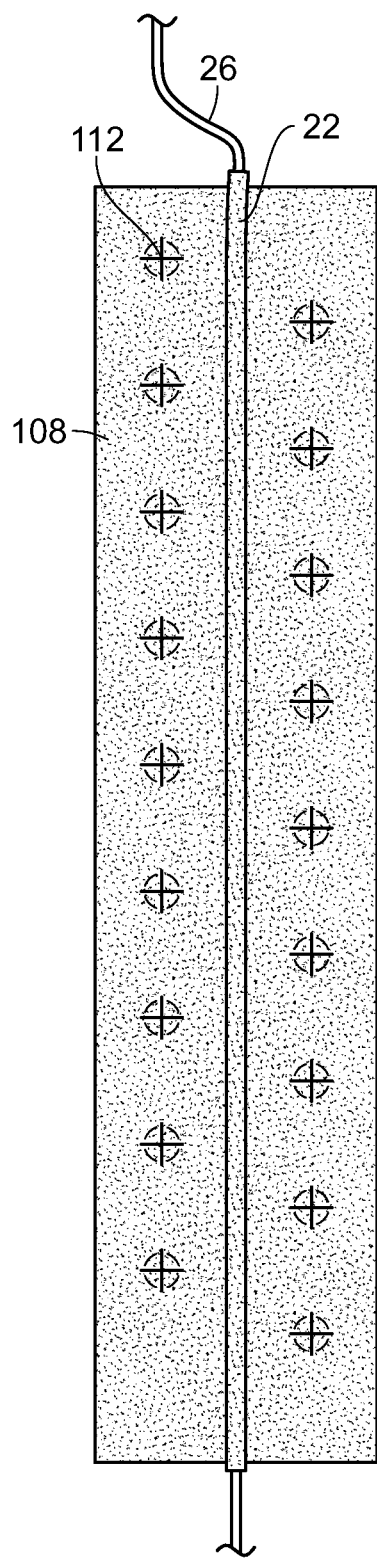
FIG. 27 is another irrigation mat device embodying the present invention, which accommodates a plurality of plants along a length thereof, in accordance with the present invention.
Figure 28:
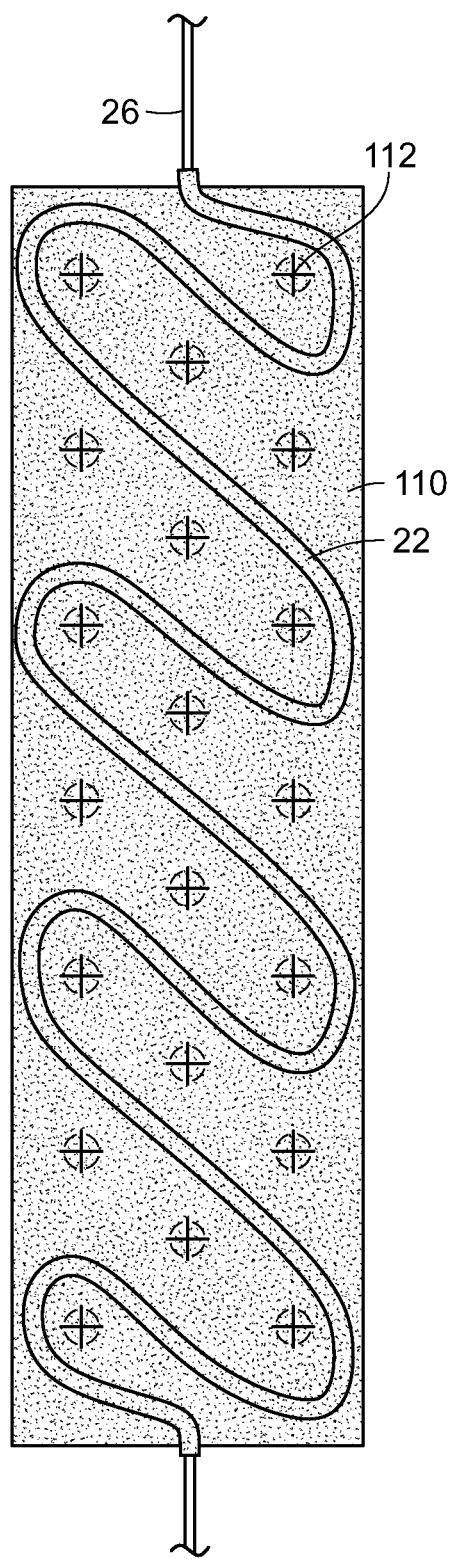
FIG. 28 is another irrigation mat device embodying the present invention for use in association with multiple plants in a simultaneous manner.

With reference now to FIGS. 27 and 28, additional mats 108 and 110 embodying the present invention are shown. These mats are sized and configured so as to accommodate the watering and irrigation of multiple plants simultaneously, all of which extend through openings 112 of the mats. A tube or line 26 connected to a water source is connected to the drip line 22, which extends through the mat 108 and 110. Similar to that described above, water is emitted into the mat which can then irrigate the plants which extend through the openings 112 of the mats 27 and 28. The openings 112 may not comprise enlarged openings or apertures, but instead slits into which small plants, seeds, etc. may be inserted and the plant allowed to grow up through the slits and openings 112. This may be useful, for example, when planting seeds, small plants or bushes, which will be close to one another, such as in a flower bed or the like.

Figure 29:
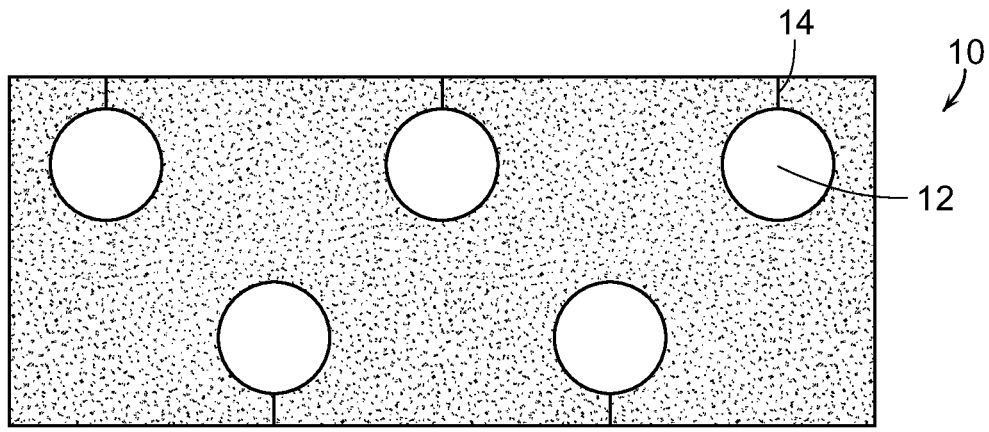
FIG. 29 is another irrigation mat device embodying the present invention for use in association with multiple plants in a simultaneous manner.

With reference now to FIG. 29, another irrigation mat device 10 embodying the present invention is illustrated. The mat is enlarged so as to have a plurality of spaced-apart plant openings 12, each of which have a slit 14 formed to a peripheral edge thereof such that the mat 10 can be placed around multiple existing plants, bushes or trees or the like. Alternatively, seeds, small plants or the like could be planted within the space of the opening 12. It will be understood that the mat 10 would include a drip tube disposed therein or associated therewith, as described above, for watering the plants, in accordance with the present invention.

Figure 30A:
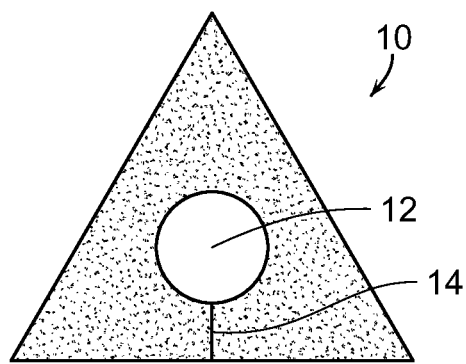
FIGS. 30A and 30B are irrigation mat devices embodying the present invention of different configurations.
Figure 30B:
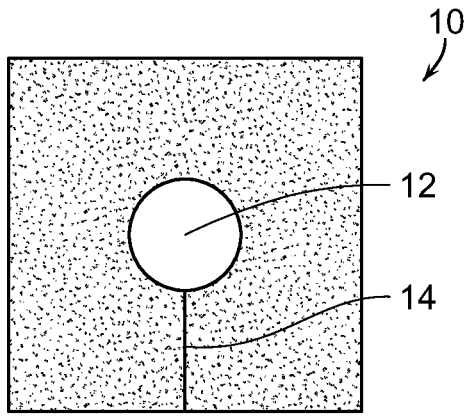

With reference now to FIGS. 30A and 30B, it will be appreciated that the mats 10 of the present invention can have various configurations, such as the illustrated triangular configuration, square configuration, etc. and is not limited to a generally circular configuration. Such configurations can be useful in certain circumstances, such as if the plant is disposed adjacent to a wall, a corner of a building, etc.

Figure 31:
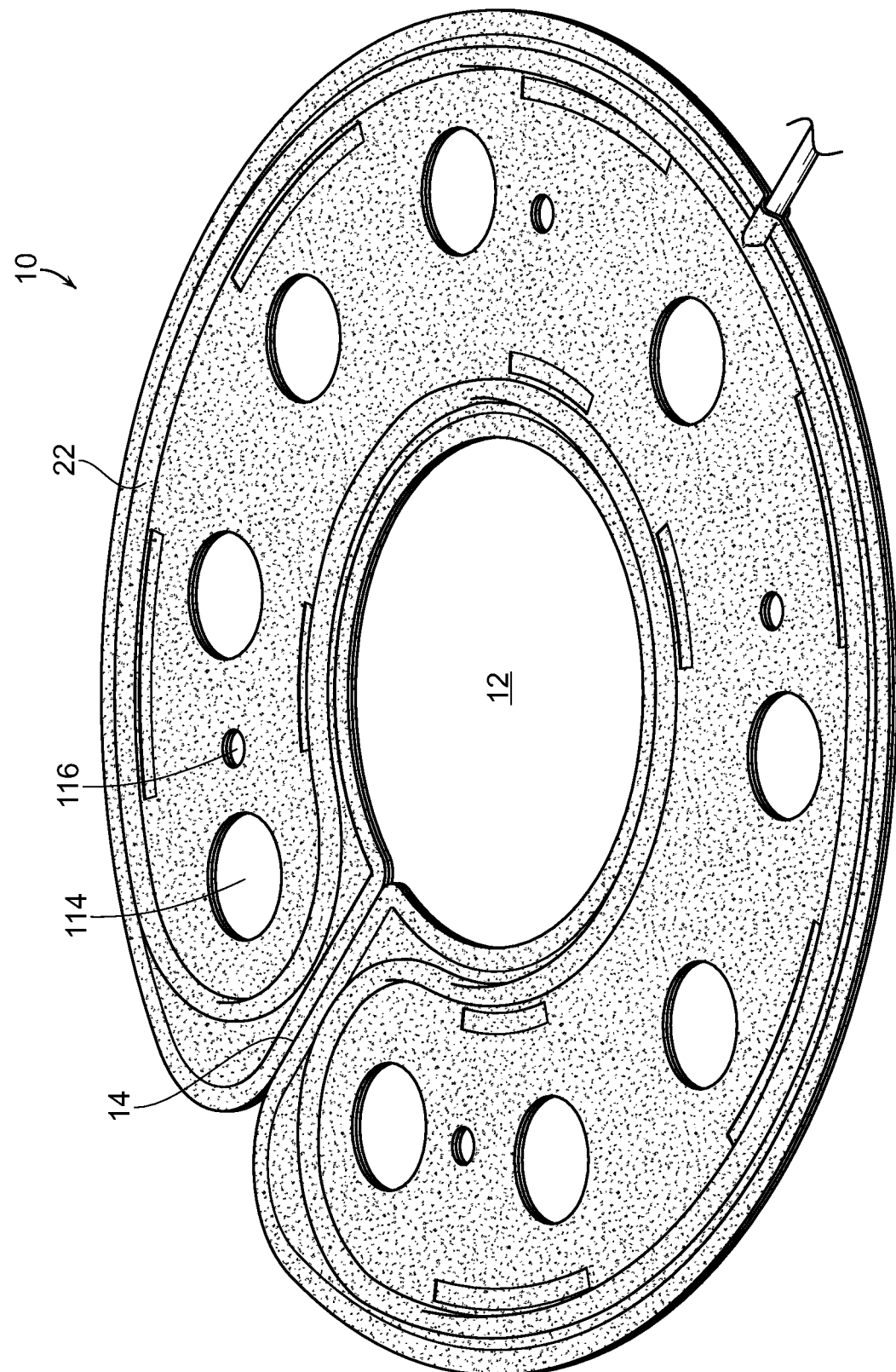
FIG. 31 is an irrigation mat device embodying the present invention having a plurality of secondary apertures extending through the mat, in accordance with the present invention.

With reference now to FIG. 31, another mat 10 embodying the present invention is shown. This mat 10 has a configuration similar to that previously described with respect to FIGS. 1-4 in that it is comprised of first and second sheets of material defining the upper and lower surfaces of the mat which are attached to one another, such as by being heat fused-attached to one another or the like. A large opening 12 is formed, typically in a center portion thereof, for placement of a plant, such as a bush, tree, or the like. A slit 14 provides the ability to place the mat 10 around an existing large plant. The central or larger aperture 12 comprises a primary or first aperture. Additional secondary apertures 114 are formed through the mat. These secondary openings 114 may be of a size for additional plants to extend through the mat. For example, a tree trunk may extend through the first or central aperture 12, with smaller plants or bushes extending through the secondary apertures 114. The secondary apertures 114 could be used to plant seeds or small plantings surrounding a larger plant, bush or tree or the like. The secondary apertures 116 may be of varying sizes, as illustrated, to accommodate plants of varying sizes. Alternatively, openings or apertures 116 could be used for insertion of stakes or other securing devices or the like.

Figure 32:
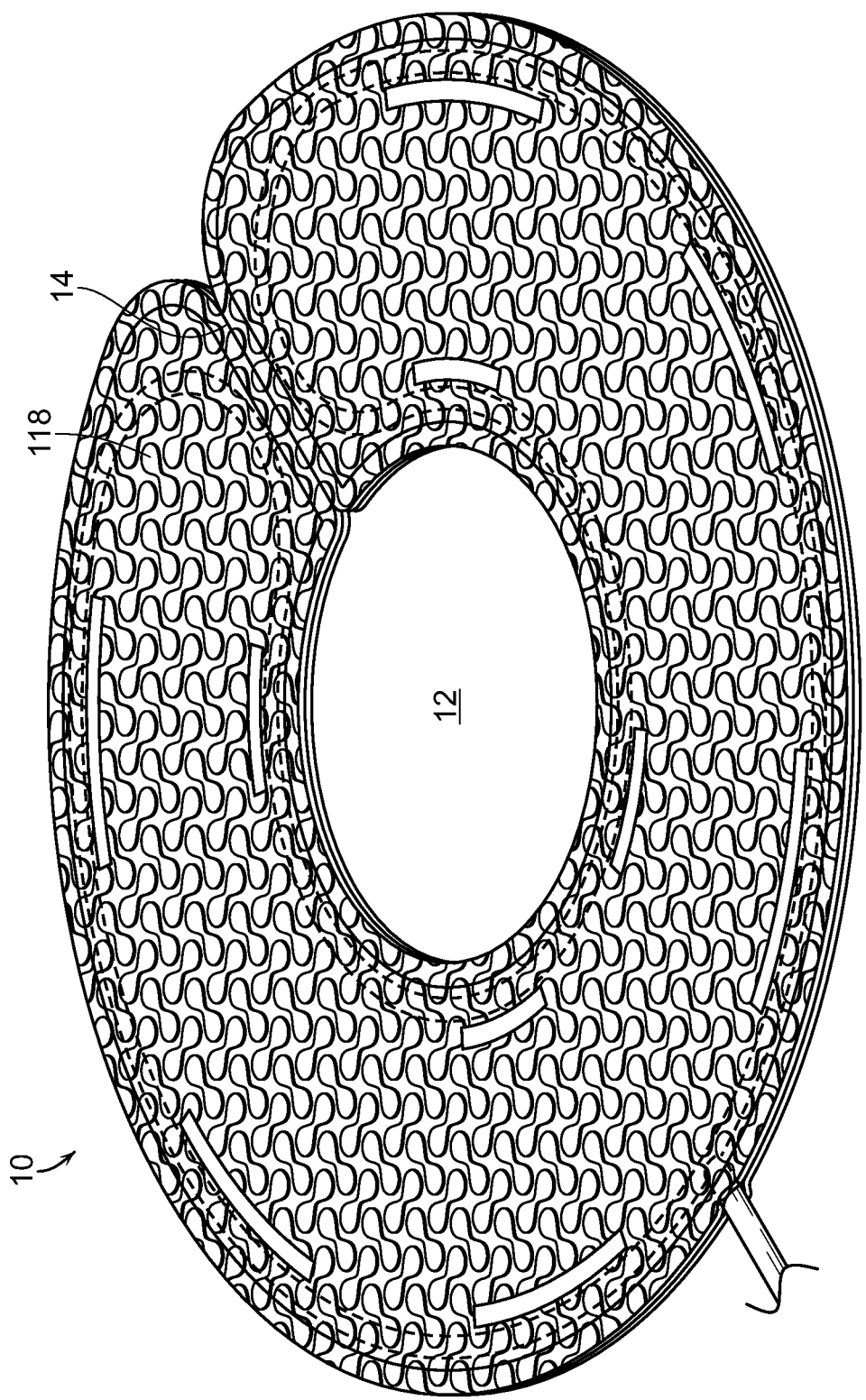
FIG. 32 is a top perspective view of another irrigation mat device embodying the present invention having an air and water movement facilitating pattern formed therein, in accordance with the present invention.

With reference now to FIG. 32, a mat 10 is illustrated which may have a configuration similar to that described above, particularly with respect to FIGS. 1-4. However, in this case, a pattern is formed in the mat material, such as by embossing or the like. The pattern 118 serves to create areas where the sheets of material are brought to one another or are raised and apart from one another. This creates passageways which facilitates air or water flow through the mat. This may be used, for example, to direct water from the drip tube to areas of the mat which are spaced apart from the drip tube, so as to water the plant more evenly across the area of the mat.

Figure 33:
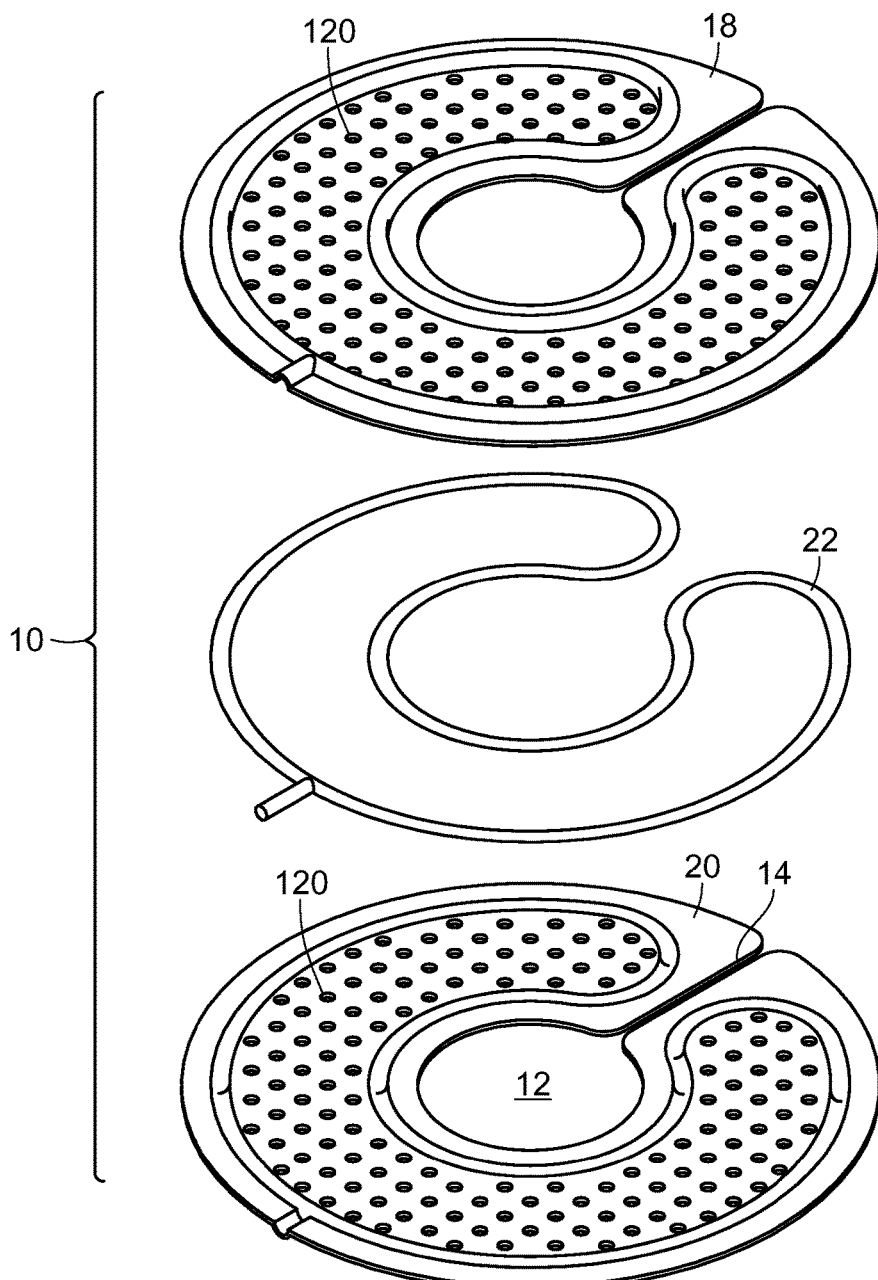
FIG. 33 is an exploded view of another irrigation mat device embodying the present invention having apertures that provide air and water permeability through the mat, in accordance with the present invention.
Figure 34:
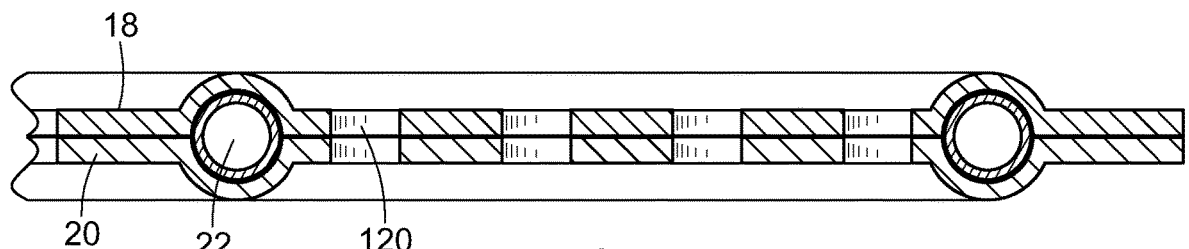
FIG. 34 is a cross-sectional view of the mat of FIG. 33.

With reference now to FIGS. 33 and 34, it is contemplated by the present invention that the upper 18 and lower 20 sheets of material be comprised of a plastic or polymer, which could be flexible, rigid, or semi-rigid. The drip tube 22 would be disposed between the layers of material 18 and 20, so as to be supported by the sheets of material 18 and 20. As the polymeric or plastic material would not be air or water permeable, a plurality of small apertures 120 are formed in the upper and lower sheets 18 and 20 of material such that air and water can pass therethrough, thus providing water to the plant below the mat 10 and providing the benefits of being air and water permeable to the health of the ground and the plant, as described above. The apertures 120 may be aligned, as illustrated in FIG. 34, or may be offset from one another, so long as air and water can travel therethrough. A water retaining and/or disbursing layer, such as illustrated and described in FIG. 9, could be placed between the plastic or polymeric sheets 18 and 20.

Figure 35:
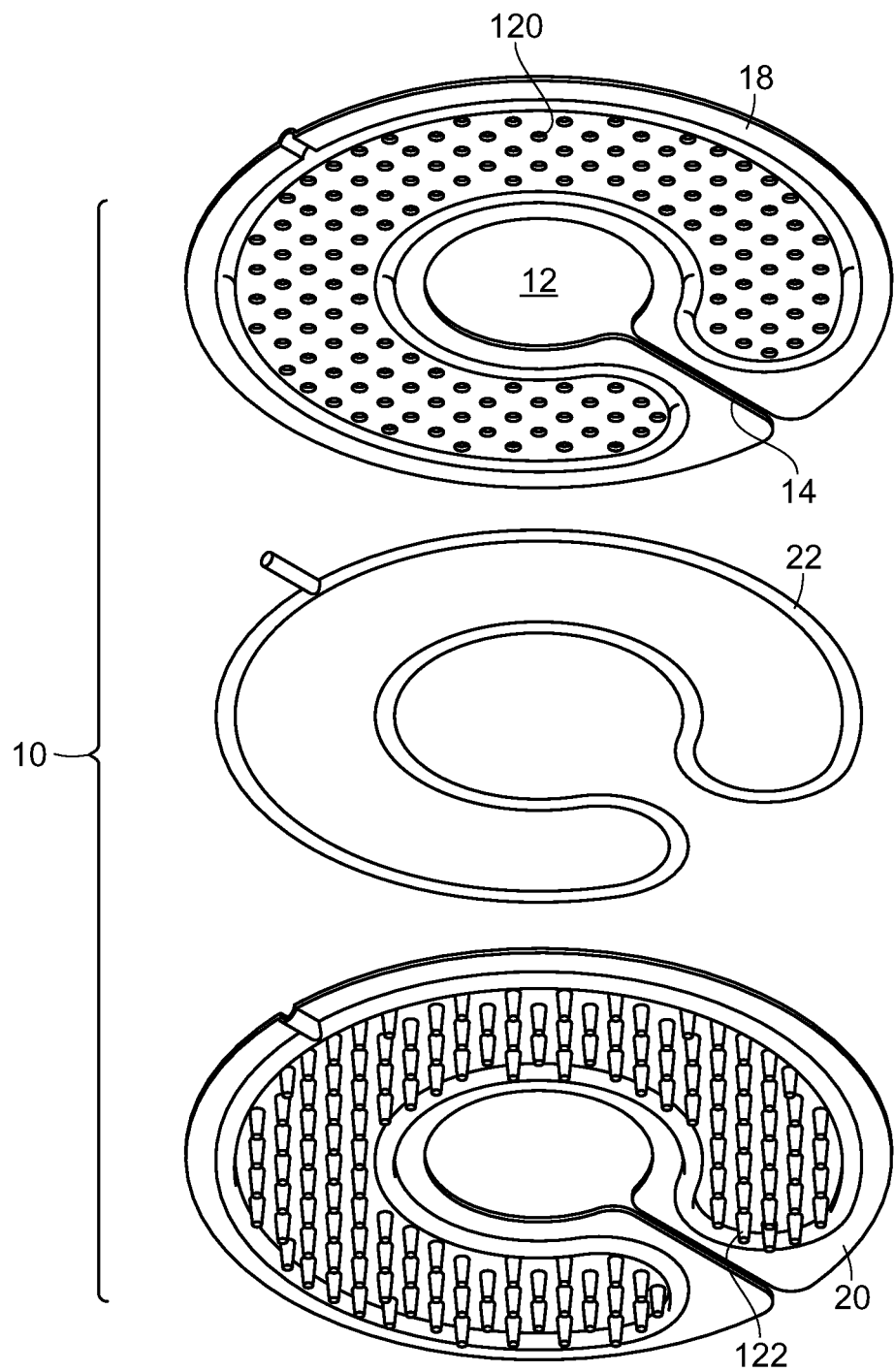
FIG. 35 is an exploded perspective view of another irrigation mat device embodying the present invention having a plurality of spikes extending from a bottom surface thereof.
Figure 36:
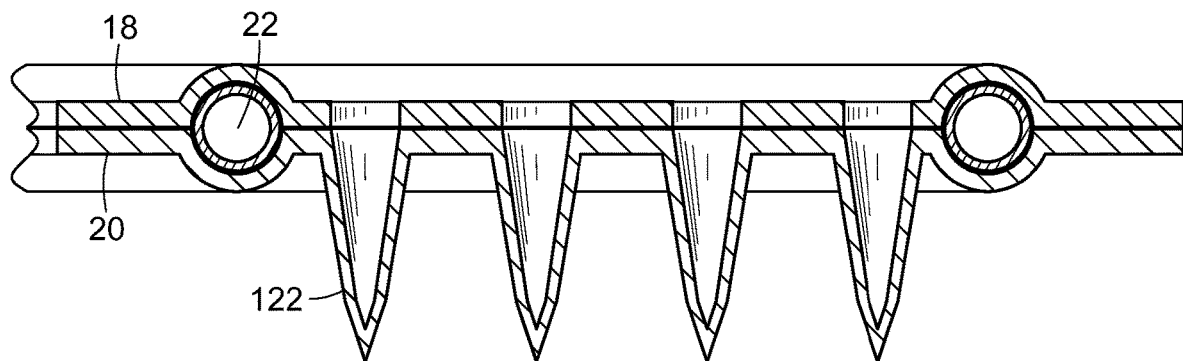
FIG. 36 is a cross-sectional view of the mat of FIG. 35.
Figure 37:
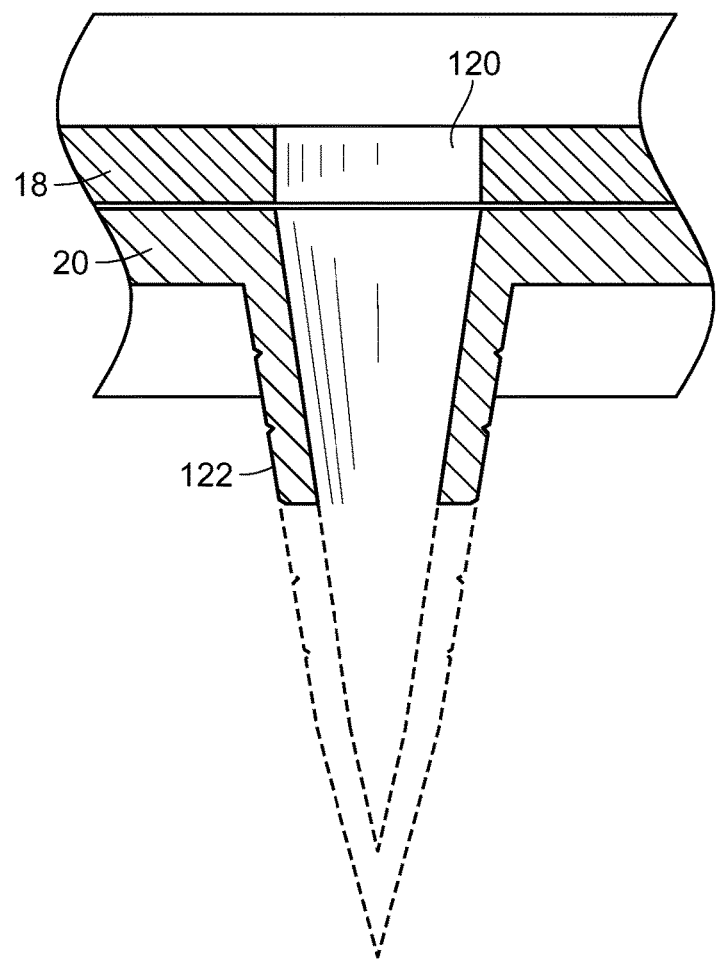
FIG. 37 is a cross-sectional view illustrating removal of a closed end of a spike to permit water to pass therethrough, in accordance with the present invention.

With reference now to FIGS. 35-37, as a variation to the mat 10 illustrated in FIG. 33, the lower layer or sheet 20, comprised of a plastic or polymeric material, could have a plurality of downwardly directed spikes 122 formed therein. The spikes 122 would serve to firmly secure and attach the mat 10 to the ground surface. The upper layer 18 may be comprised of a plastic or polymeric material having apertures 120 formed therein, as described above, or may be formed of an air and water permeable material. As illustrated in FIGS. 36 and 37, the spikes 122 may have closed ends, which can be removed, such as by cutting the ends of the spikes, as illustrated in FIG. 37, so as to permit water to flow therethrough. This could be useful, for example, to allow water flow only to desired areas. For example, in a slope installation, only the uphill side of the mat 10 would have the spikes 122 cut, so as to allow water to flow on the uphill portion of the slope, which would naturally flow downhill. It is contemplated, however, that all of the spikes 122 be open-ended so as to allow water to flow therethrough, such as from the drip tube 22.

Figure 38:
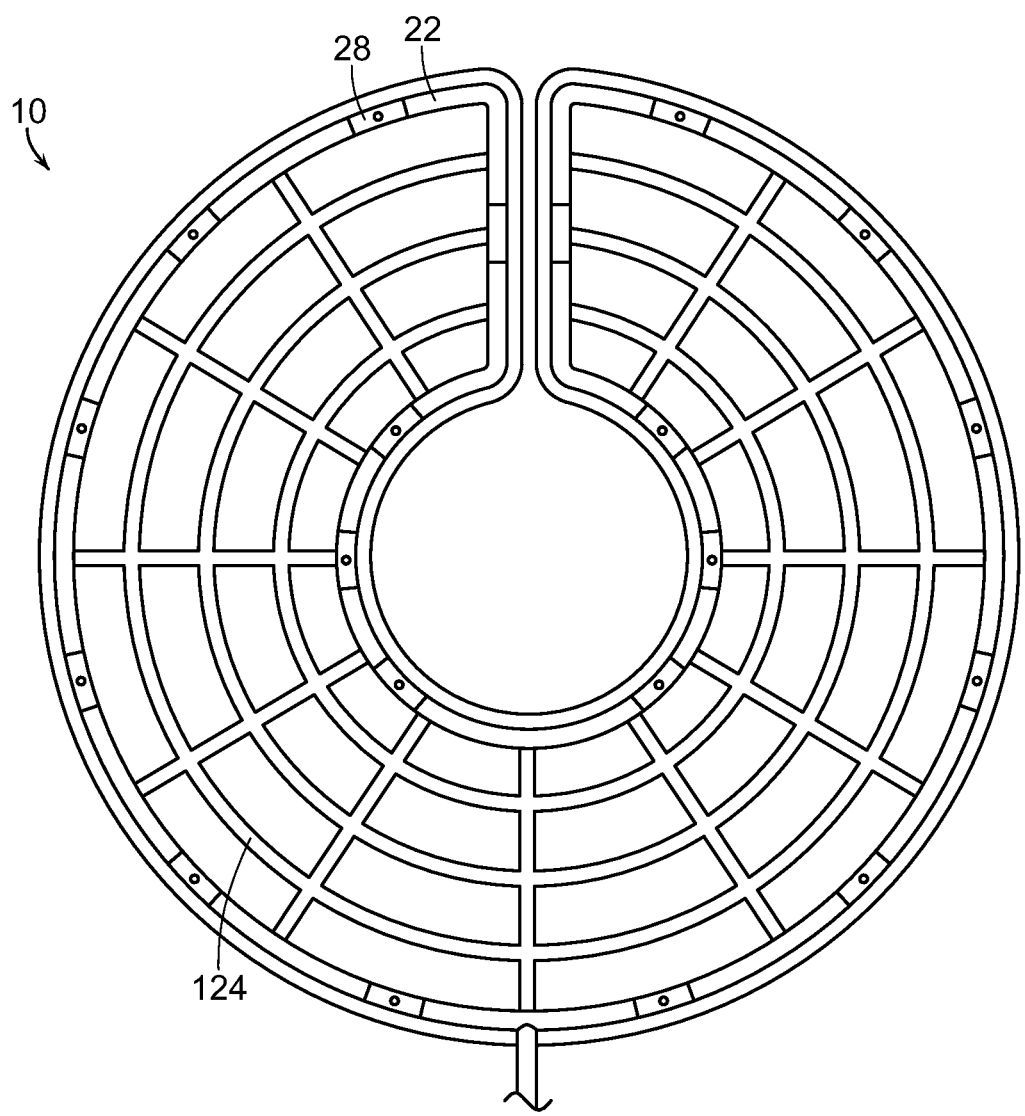
FIG. 38 is a top view of an irrigation mat device embodying the present invention comprised of a web or lattice structure having a drip tube integrally formed therewith, in accordance with the present invention.

With reference now to FIG. 38, a mat 10 is shown formed of a web or lattice structure 124. The mat 10 may be generally planar. The web or lattice structure may be formed of various material, but typically a plastic material which may be flexible, rigid, or semi-rigid. The drip tube 22 is formed integrally with the lattice structure 124. The drip tube 22 would be hollow and have a series of apertures or emitters 28 spaced along a length thereof for emitting water from the drip tube 22. The remainder of the lattice structure 124 may also be hollow, but closed off from the pathway of the drip tube 22. Alternatively, the entirety of the lattice structure 124 is generally hollow and has a series of apertures of emitters 28 formed therein for emitting water at desired locations or in a desired pattern. It will be understood that the mat 10 may comprise only the web or lattice structure 124 and drip tube 22, or the structure may be either suspended within a mat material or disposed between upper and lower layers thereof, as deemed necessary or desirable.

Figure 39:
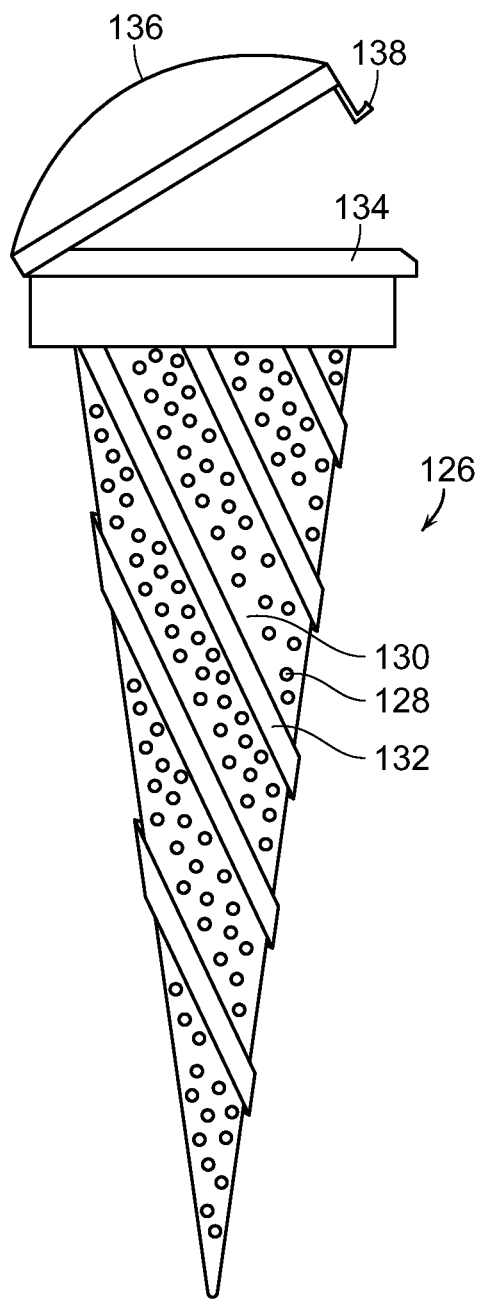
FIG. 39 is an elevational view of a hollow stake with an open cap, used in accordance with the present invention.
Figure 40:
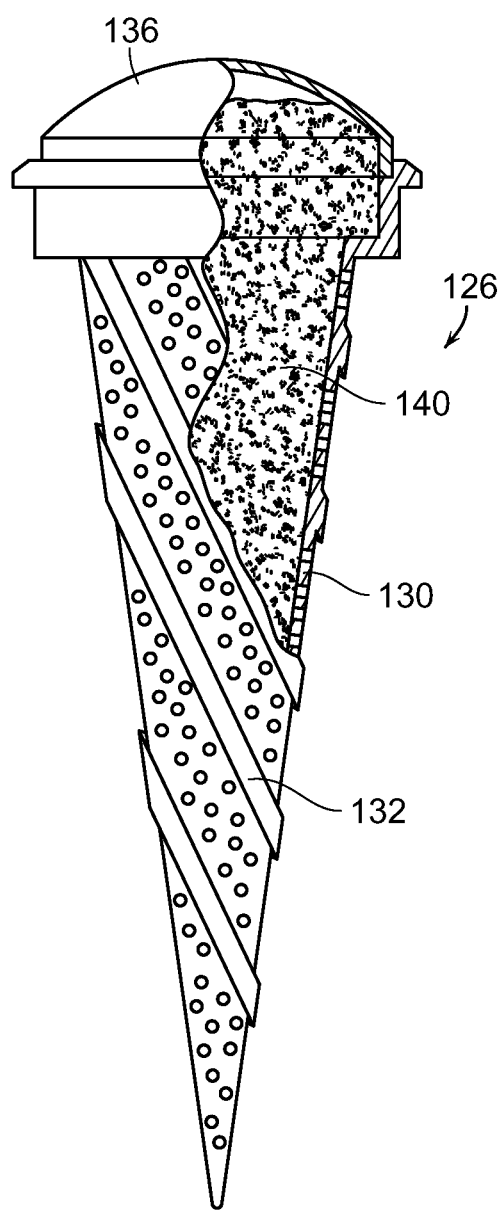
FIG. 40 is an elevational and partially sectioned view of the hollow stake of FIG. 39, having fertilizer or the like inserted therein with the cap closed, in accordance with the present invention.

With reference now to FIGS. 39 and 40, a hollow stake 126 is illustrated which may be used in association with any of the mats 10 illustrated and described above. As an example, the hollow stake 126 may be inserted into a secondary aperture 114 or 116 of the mat 10 illustrated in FIG. 31. Alternatively, the hollow stake 126 may be inserted into the ground into the primary or central aperture 12 of the mat 10, or in association with the mat 10, such as adjacent to a peripheral edge thereof.

The stake 126 is hollow and has a plurality of apertures 128 formed in a wall 130 thereof, or alternatively the wall 130 is permeable, such that contents placed within the stake 126 may be dispensed from the stake 126. Ribs 132, such as the illustrated spiral ribs, may be provided for strength, such as when inserting the stake 126 into hard soils or the like. The stake 126 has an open end 134 which may be closed, such as by means of a cap 136 having a clasp 138 which engages a portion of the stake 126 so as to be retained in a closed state in a selective manner.

In use, as illustrated in FIG. 40, the hollow interior of the stake 126 is filled with a desired material 140, typically fertilizer, insecticide or fungicide. Over time, the material 140, in the form of a fertilizer, insecticide or fungicide, will pass through the wall 130, such as through openings 128, and into the ground. This will serve to fertilize the one or more plants associated with the mat, or to provide protection due to the insecticide or fungicide, etc. which is dispensed from the hollow stake 126. As necessary, the cap 136 is opened and additional material 140 inserted into the hollow stake 126 to replenish the material 140.

Although several embodiments have been described in detail for purposes of illustration, various modifications may be made without departing from the scope and spirit of the invention. Accordingly, the invention is not to be limited, except as by the appended claims.

What is claimed is:

1. A plant irrigation device, comprising:
a support comprised of an upper sheet of material and a lower sheet of material and having a configuration to surround a plant and provide an opening through which the plant extends; and
a drip tube attached to the support, the drip tube connectable to a water source and having a series of spaced apart apertures or water emitters along a length thereof permitting water to exit the drip tube and into the ground surrounding the plant;
wherein each of the upper and lower sheets of the support defines an open-faced channel into which the drip tube is disposed.

2. The irrigation device of claim 1, wherein at least the upper or lower sheet of the support is comprised of a rigid material.

3. The irrigation device of claim 1, wherein the support has a generally C-shaped configuration.

4. The irrigation device of claim 1, wherein the support has a generally circular configuration with free ends creating a slot for insertion of a plant therethrough and into the opening in a central portion thereof.

5. The irrigation device of claim 1, wherein the support is generally planar.

6. The irrigation device of claim 1, wherein the drip tube has a generally circular or semi-circular configuration when attached to the support.

7. The irrigation device of claim 1, wherein the drip tube is comprised of a flexible material.

8. The irrigation device of claim 1, wherein the water emitters comprise spray nozzles.

9. The irrigation device of claim 1, wherein the water emitters have at least one of pressure compensating, anti-siphon, anti-clogging, self-flushing or check valve properties.

10. A plant irrigation device, comprising:
a support comprised of an upper sheet and lower sheet of material, at least one of the upper or lower sheet of material being rigid, the support having a generally circular configuration to surround a plant and provide a central opening through which the plant extends, each of the upper and lower sheets of the support defining an open-faced channel; and
a drip tube disposed within the channel of the support, the drip tube connectable to a water source and having a series of spaced apart apertures or water emitters along a length thereof permitting water to exit the drip tube and into the ground surrounding the plant.

11. The irrigation device of claim 10, wherein the support has free ends creating a slot for insertion of a plant therethrough and into the central opening thereof.

12. The irrigation device of claim 10, wherein the support is generally planar.

13. The irrigation device of claim 10, wherein the drip tube has a generally circular or semi-circular configuration when attached to the support.

14. The irrigation device of claim 10, wherein the drip tube is comprised of a flexible material.

15. The irrigation device of claim 10, wherein the water emitters have at least one of pressure compensating, anti-siphon, anti-clogging, self-flushing or check valve properties.

16. The irrigation device of claim 10, wherein the support has a generally C-shaped configuration.

* * * * *